INVENTOR.
Francis Chamberlain

INVENTOR.

Francis Chamberlain

June 26, 1945.  F. CHAMBERLAIN  2,378,981
CELESTIAL NAVIGATION INSTRUMENT
Filed Sept. 3, 1943  10 Sheets-Sheet 3

INVENTOR.
Francis Chamberlain

June 26, 1945.　　F. CHAMBERLAIN　　2,378,981
CELESTIAL NAVIGATION INSTRUMENT
Filed Sept. 3, 1943　　10 Sheets-Sheet 4
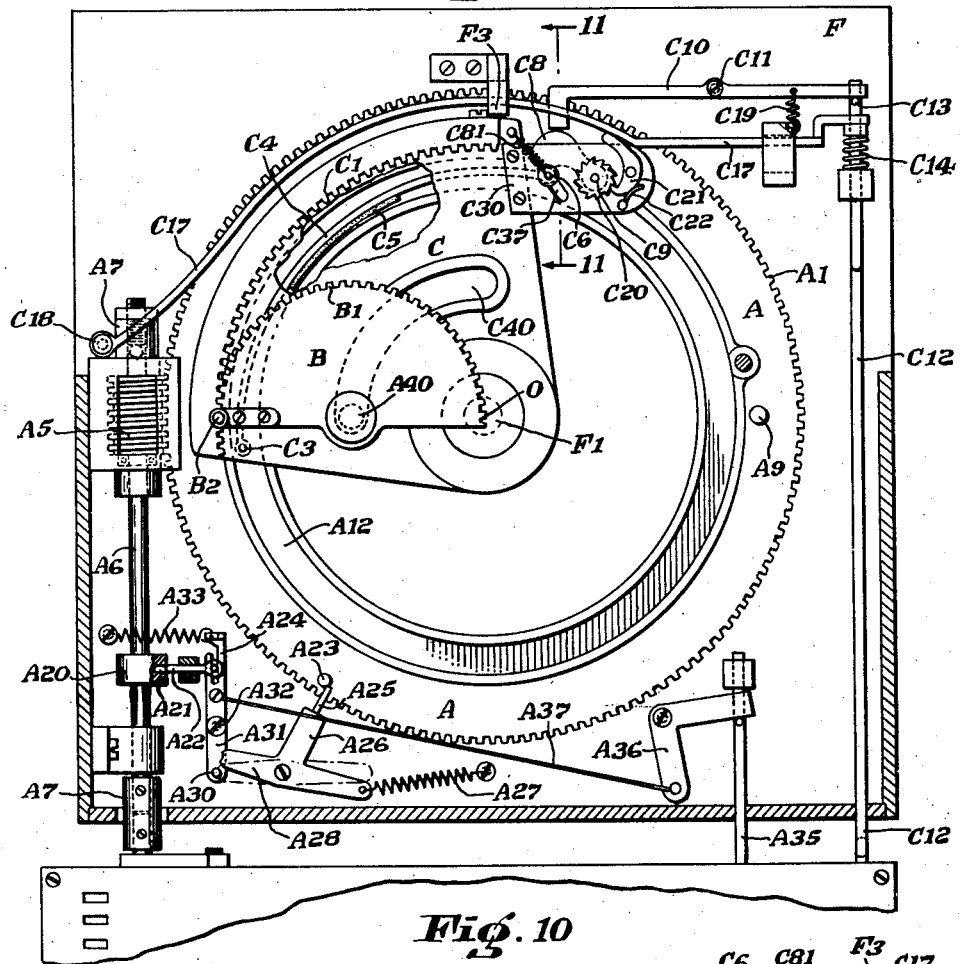
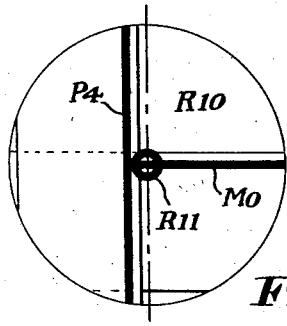
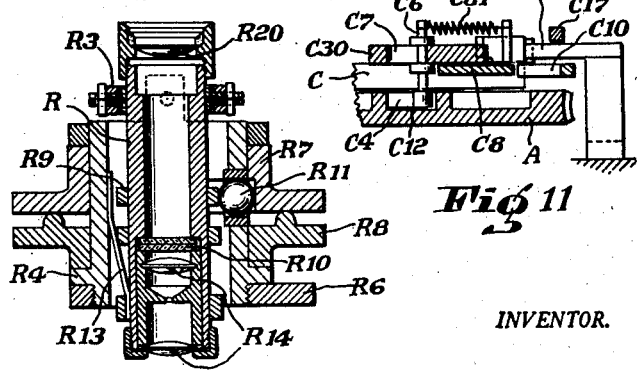
INVENTOR.
Francis Chamberlain

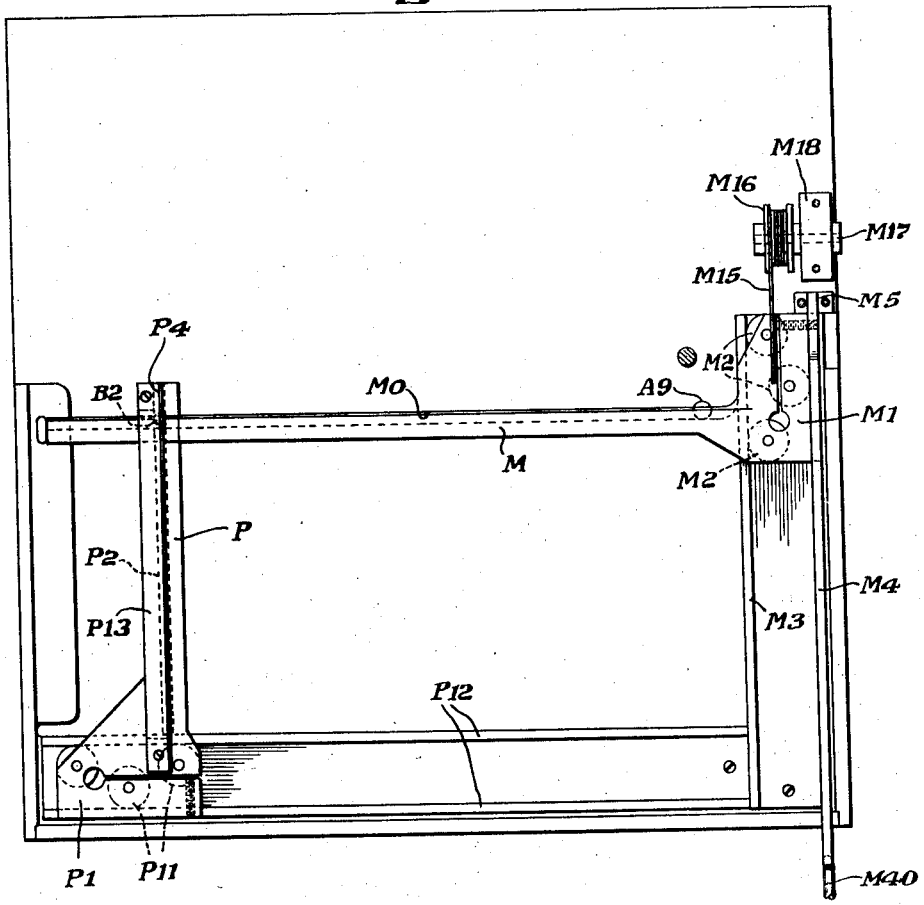
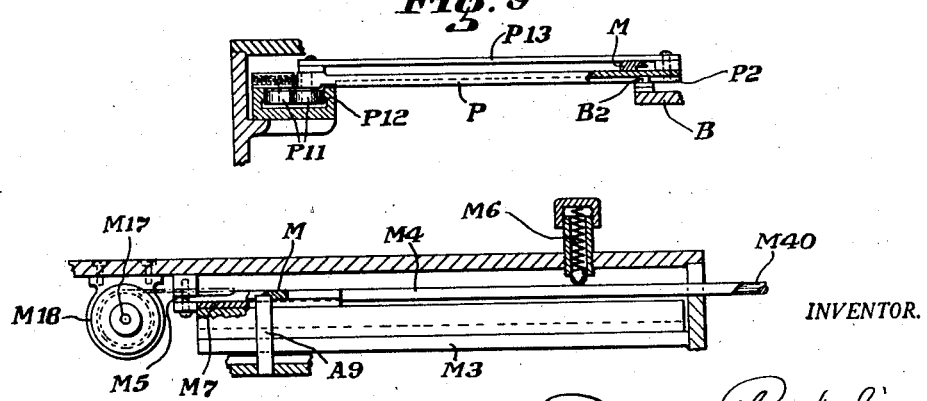

INVENTOR.
Francis Chamberlain

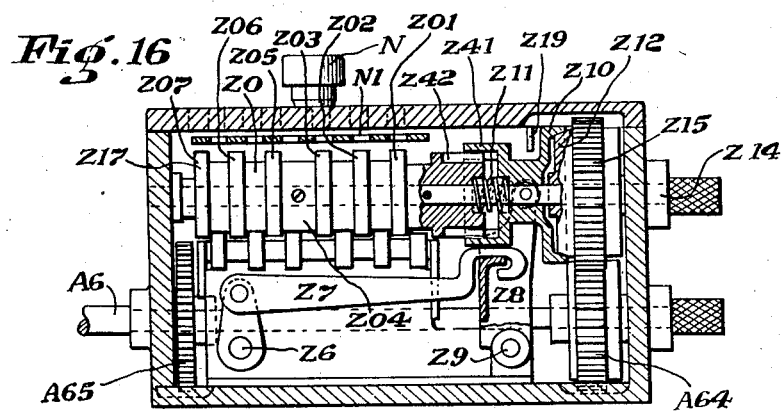
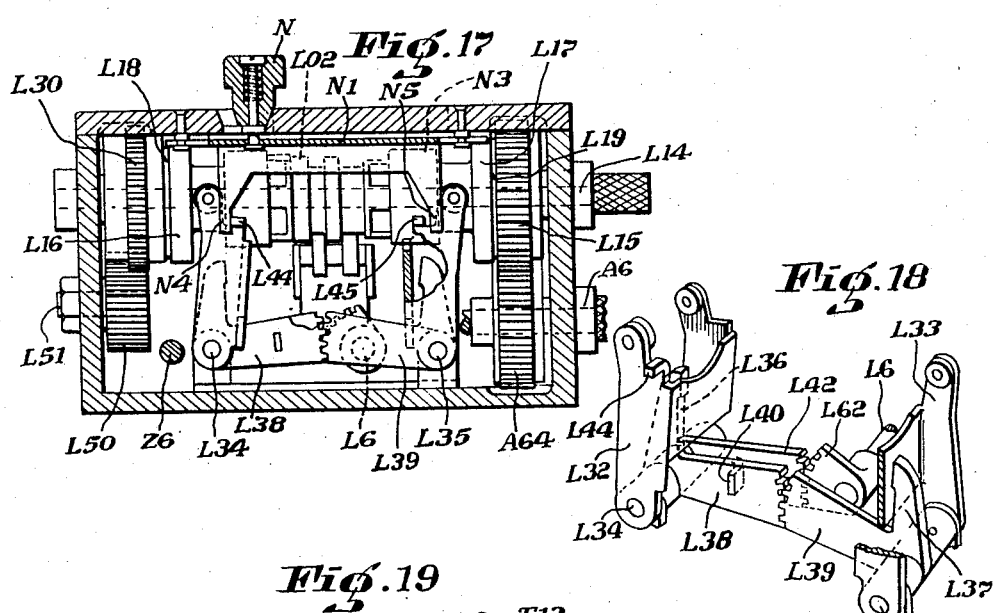
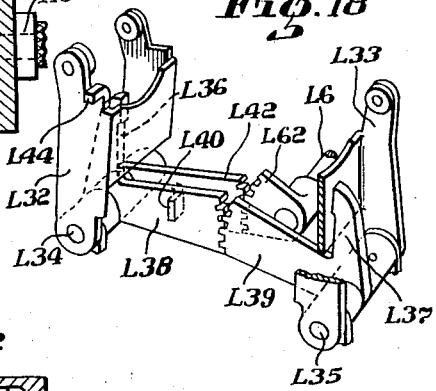
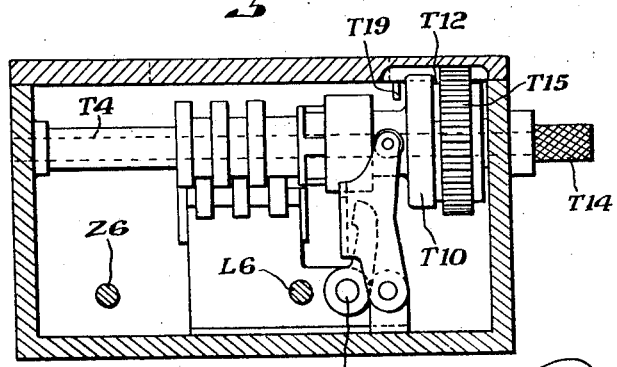

INVENTOR.
Francis Chamberlain

June 26, 1945.　　　F. CHAMBERLAIN　　　2,378,981
CELESTIAL NAVIGATION INSTRUMENT
Filed Sept. 3, 1943　　　10 Sheets-Sheet 9

INVENTOR.
Francis Chamberlain

June 26, 1945. F. CHAMBERLAIN 2,378,981
CELESTIAL NAVIGATION INSTRUMENT
Filed Sept. 3, 1943 10 Sheets-Sheet 10
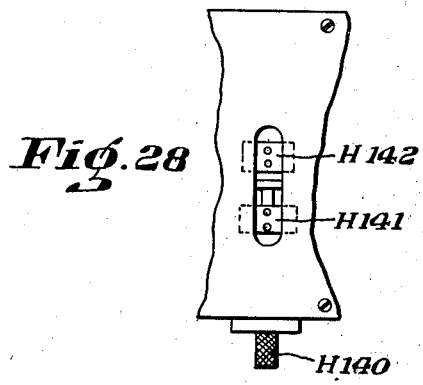
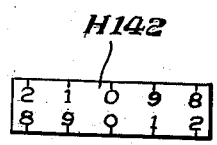
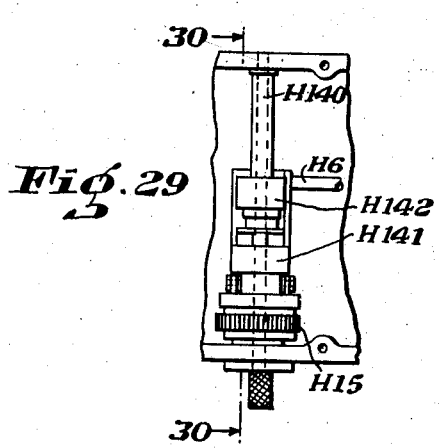
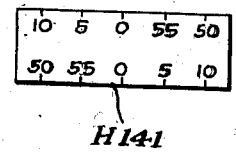
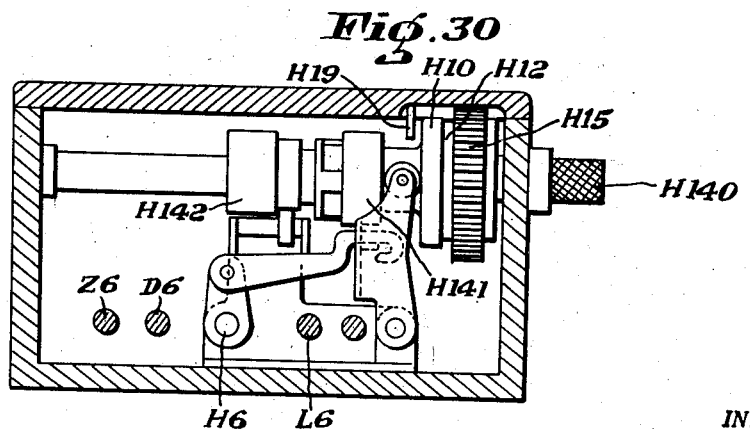
INVENTOR.
Francis Chamberlain Patented June 26, 1945

2,378,981

UNITED STATES PATENT OFFICE 2,378,981

CELESTIAL NAVIGATION INSTRUMENT

Francis Chamberlain, Arlington, Mass.

Application September 3, 1943, Serial No. 501,123

22 Claims. (Cl. 33—1)

This invention relates to a celestial navigation instrument and method for solving the problems of navigators' astronomical triangles. Its principal use is in the solution of usual Summer lines of position, and obtaining azimuth and intercept, although it is also of use in determining the identity, the time of rising or setting of a celestial body, and the time at which such a body will be on the prime vertical. The invention also may be employed in determining initial course and great circle distance between any two points on the earth's surface that lie on the same side of both branches of a meridian and are not over 90° apart. Any and all of such problems may be readily solved by this invention without employing bulky and troublesome tables such, for example, as H. O. 214.

A great advantage of the apparatus is that it may be made to record visibly on counters the given data and the determined data in connection with the various uses of the instrument. The instrument is particularly valuable in airplanes where navigators must perform their duties under conditions of fatigue, unsteadiness, reduced oxygen, cramped quarters and inadequate light—all of which handicaps are substantially avoided by the present invention together with errors that would otherwise result therefrom.

In the drawings—

Fig. 6 is a plan on the line 6—6 of Fig. 5;

Fig. 7 is a plan on the line 7—7 of Fig. 5 showing the bars M and P;

Fig. 8 is an elevation, partly in section, from the left of Fig. 7;

Fig. 9 is a side view of the bar P shown in Fig. 7;

Fig. 10 is a vertical cross-section of the eye tube;

Fig. 11 is a vertical cross-section on the line 11—11, Fig. 6;

Fig. 12 is an enlarged plan of the reticle and the observed image as seen through the eye tube;

Fig. 16 is an elevation on the line 16—16 of Fig. 14;

Fig. 17 is an elevation on the line 17—17 of Fig. 14;

Fig. 18 is a perspective view of the clutch operating devices shown in Fig. 17;

Fig. 19 is an elevation on the line 19—19 of Fig. 14;

Figs. 28-32 illustrate a modification of the counters so as directly to obtain and indicate the intercept, in which Fig. 28 is a fragmentary plan view illustrating the intercept counter;

Fig. 29 a view illustrating the mechanism of the device of Fig 28;

Fig. 30 an elevation of the apparatus of Figs. 28 and 29, and

Figs. 31 and 32 are views illustrating the counters of Fig. 28.

Figure 1:
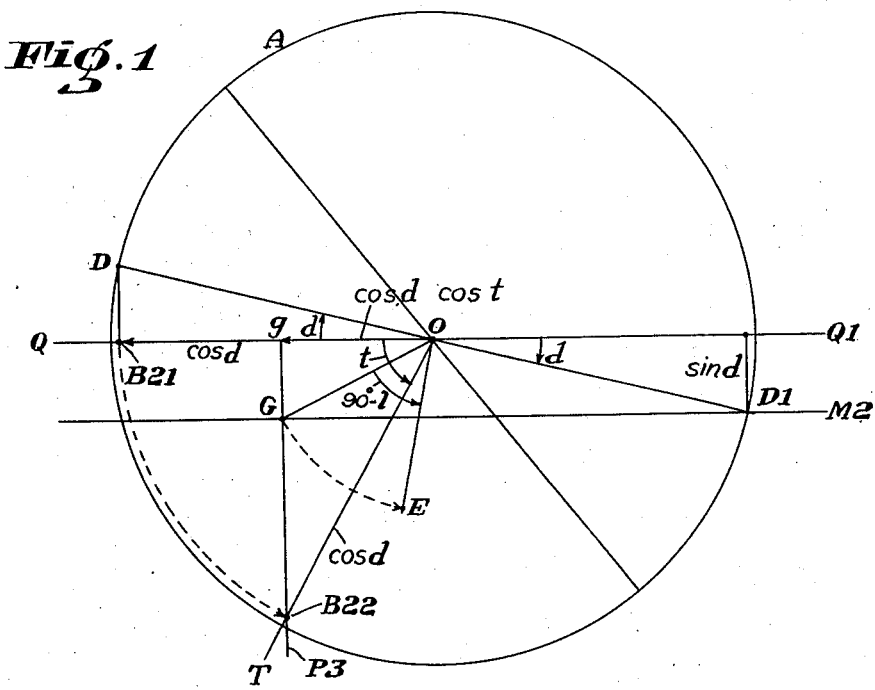
Figs. 1, 2 and 3 are diagrams illustrating the method, or mode of operation, employed in the use of the instrument.
Figure 2:
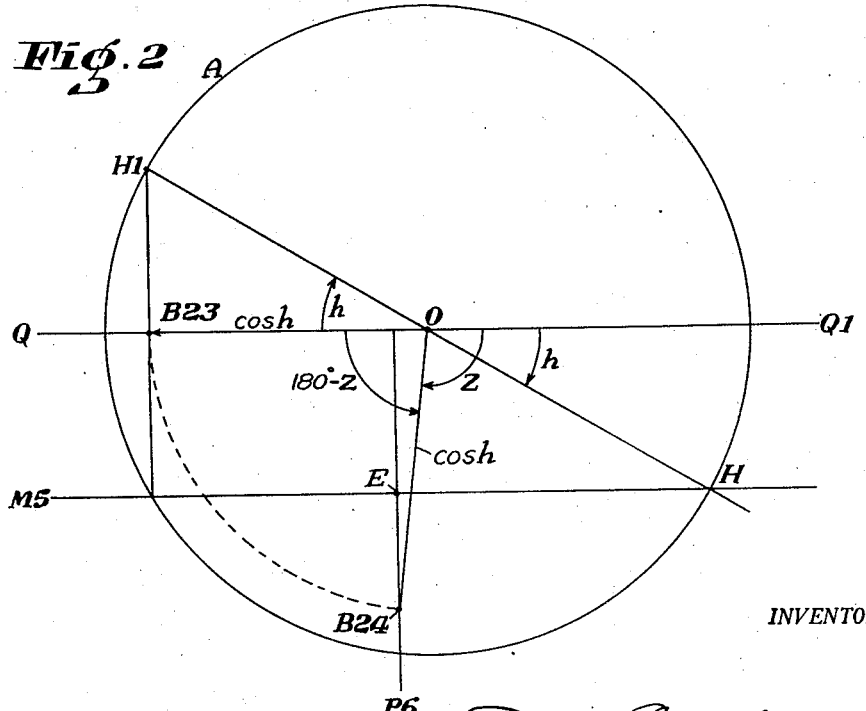
Figure 3:
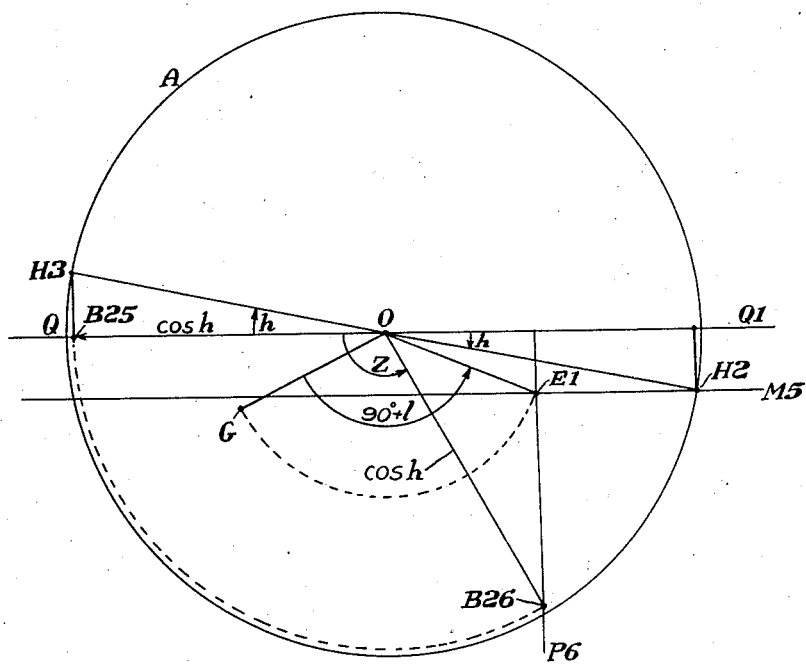

Figs. 1, 2 and 3 diagrammatically illustrate the procedure for ascertaining the altitude $h$ and the azimuth $z$ of a celestial body when the assumed or D. R. (dead reckoning) latitude $l$ of the observer and the declination $d$ and the local hour angle $t$ of the body are given. A is a circle representing the meridian of the observer in a plane representing the observer's meridian plane. The center of A is at 0, representing the center of the earth, and the horizontal diameter Q, Q1 represents the line produced by the intersection of the equator plane and the observer's meridian plane.

The first procedure is to locate the point G representing the projection on the observer's meridian plane of the ground point of the celestial body, i. e., the point G is the intersection with the observer's meridian plane of a line perpendicular to said plane and passing through the ground point on the surface of the earth.

The procedure is as follows:

A diameter D, 0, D1 is drawn to make an angle Q1, 0, D1, equal to the declination $d$, with the line Q, Q1. Then 0, B21 equals cos $d$.

A horizontal line M2, parallel to Q, Q1, is drawn through D1, i. e., at a distance sin $d$ from Q, Q1.

A radius OT is drawn making an angle Q, 0, T, equal to the local hour angle $t$, i. e., $t=$Q, 0, T. A point B22 on line 0, T is noted at a distance from 0 equal to cos $d$.

The intersection $g$ of the perpendicular P3 through B22 and the diameter Q, Q1 is at a distance from 0 equal to cos $d$ cos $t$. The intersection G of perpendicular P3 with line M2 is the projection of the ground point of the celestial body on the observer's meridian plane.

The next procedure is to measure the altitude $h$ of the celestial body, assuming that $d$ and $l$ are of the same name (either both north, or both south), as follows:

A radius is drawn making an angle with the line 0G equal to the co-latitude $(90°-l)$ of the observer and on that line a point E is located at a distance from 0 equal to 0, G. The diameter Q, Q1 in relation to point E now represents the line of intersection of the observer's horizon plane with his meridian plane.

This same point E is located in Fig. 2.

A horizontal line M5, drawn through E, Fig. 2, intersects the circle A at H. The angle Q1, 0, H equals the altitude $h$ of the celestial body, i. e., $h=$Q1, 0, H.

The next procedure is to measure the azimuth $z$ of the celestial body.

A line P6, through the point E perpendicular to Q, Q1, intersects a circle having a radius equal to cos $h$ at B24. The angle Q1, 0, B24 equals the azimuth $z$, measured from the elevated pole.

To sum up:

$$h=G1, 0, H$$

and $$z=Q1, 0, B24$$

If $d$ and $l$ are of opposite names (one north or south and the other south or north), the same procedure is followed to locate the point G the projection of the ground point of the celestial body.

The point E1, Fig. 3, is located on a radius making an angle $90+l$ with 0, G, and at a distance 0, G from 0.

Proceeding as before to locate the points H2, and B25, and B26, the altitude $h$ and the azimuth $z$ measured from the elevated pole respectively of the celestial body are—

$$h=Q1, 0, H2$$

and $$z=Q, 0, B26$$

The angle $90°-l$ or $90°+l$ is the angle made by the plane of the observer's horizon with the plane of the equator. If the declination is the same name (north or south) as the latitude, the angle is $90°-l$. If the declination is of the opposite name to the latitude, the angle is $90°+l$.

As provided in the modification of Figs. 28–32, hereinafter explained, the intercept may be directly obtained and indicated by counters in place of the computed latitude without any calculation by the operator.

In the following description the expressions up and down and right and left or similar expressions are used, where the context is appropriate, with reference to the figures as drawn on the sheets. In practice the instrument is held in a horizontal position with the crank A14, Fig. 13, on the right, convenient to the operator's right-hand, and the figures on the counters are right side up and when read from the left.

Figure 4:
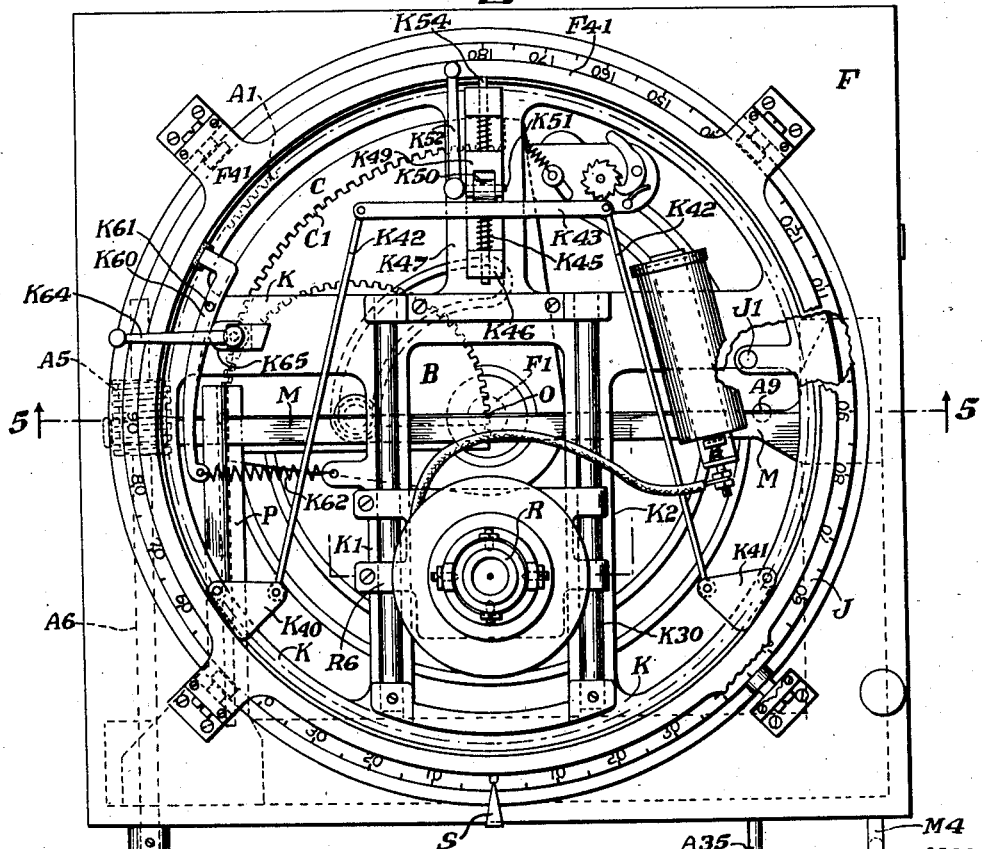
Fig. 4 is a plan view of the instrument.
Figure 5:
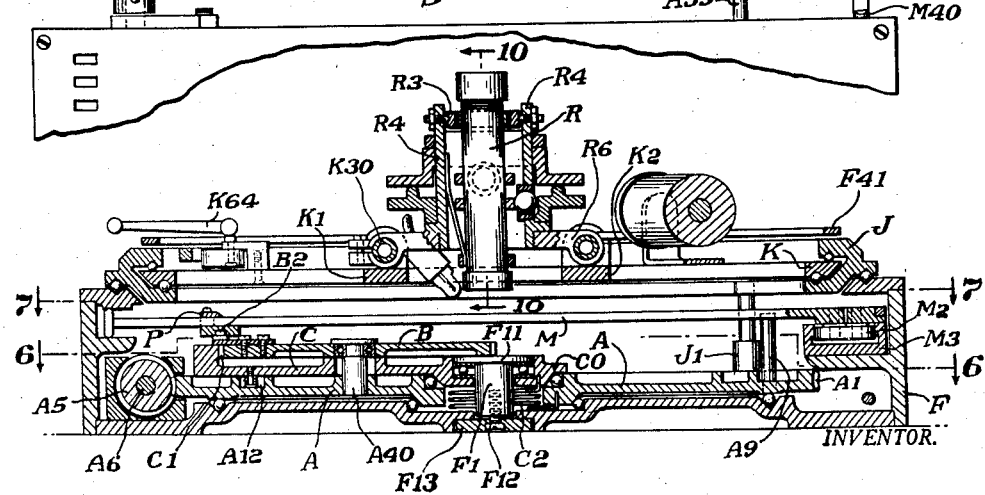
Fig. 5 is a vertical cross-section on the line 5—5 of Fig. 4.

The moving parts of the apparatus are mounted upon a frame F, at the center 0 of which is a stud F1, Figs. 4 and 5. The stud has a head F11, Fig. 5, which is pulled down by a bolt F12 and washer F13 against a ball bearing to press and center the hub C0 of the quadrant C against the balls in the annular groove in the wheel A. The wheel A bears on and is centered by the balls in the annular groove in the frame F. By these means the wheel A and the quadrant C may turn with the minimum of friction about the center 0.

The wheel A has on its circumference three hundred and sixty worm teeth A1, one tooth being equal to one degree. Meshing with these worm teeth is a worm wheel A5 fixed on a shaft A6 in bearings A7, Fig. 6. Shaft A6 extends into the box containing the counter mechanism, Figs. 13, 14 and 15. One revolution of the shaft A6 moves the wheel A one tooth or one degree.

Shaft A6, Figs. 16 and 17, has fixed thereon a gear A64 which meshes with gear L15. Gear L15 is one of a train of meshing gears, L15, T15, D15 and H15, Fig. 14. Gear A64 also meshes with gear Z15, Fig. 16. These gears may be loose on the shafts L14, T14, D14, H14 and Z14, respectively, or preferably, to minimize friction, they may be mounted on ball bearings on hubs fastened to and projecting from the side of the frame. Gear H15 meshes with gear A61, which is operated by the crank A14, Fig. 14. Rotating crank A14 rotates all the gears, the shaft A6 and the wheel A.

Means are provided to lock the wheel A in its zero position, Fig. 6. A collar A20, fast on shaft A6, has a recess A21 into which a pin A22 may project when the wheel A is in zero position. Then a pin A23 thereon strikes the arm A25 of a three arm lever A26 and, against the tension of spring A27, lifts its arm A28 above, or below, a pin A30 on one end of lever A31 pivoted at A32 to the frame, thereby permitting the spring A33 to pull the upper end of lever A31 to the left and project the pin A22 into the recess A21. The pin A22 has a pin and slot connection with the upper arm of lever A31. To withdraw the pin A22 and thereby release the shaft A6 and the wheel A, the rod A35 is lifted, thereby rocking lever A36 to pull the link A37 and the upper end of lever A31 to the right. Then, when the wheel A is turned clockwise or anticlockwise, as it is in the operation of the instrument, the pin A23 releases the arm A25 of lever A26 and the spring A27 rocks the lever to bring its left end A28 into register with pin A30 and, provided rod A35 is lowered, to hold the lever A31 and the pin A22 in retracted unlocking position.

On the right-hand side of wheel A is a vertical pin A9, Figs. 4, 5 and 6, the center of which lies on the horizontal line through the center 0 of the wheel A. Pin A9 controls the movement of straight-edge means, as here shown a horizontal bar M, Fig. 7, which is pressed upward against the pin and has an engraved line M0 above and passing through the extended axis of the pin. This line I call the "indicative line" of bar M.

The bar M has at its right end a block M1 provided with rollers M2 which slide in guides M3 and maintain the bar horizontal. The bar M is pulled upward and held against the pin A9 by a cord M15 wound on a reel M16 on a shaft M17. The shaft is turned so as to wind the cord onto the reel by a coiled spring (not shown) in the box M18.

When the wheel A is turned clockwise about 0, the pin A9 pushes the bar M, against the tension of the spring, downward to a position depending upon the degree of rotation of the wheel A. The bar M may then be clamped in position by a rod M4, Fig. 8, which is pivoted at M5 on the frame and extends parallel to the guides M3 and lies above a friction pad M7 in the block M1. A spring M6 presses rod M4 down to bear against the friction pad. The rod M4 has a beveled end, Fig. 26, by which it may be lifted by a rod M40 which has a beveled end adapted to pass under the beveled end of rod M4. When the rod M40 is moved down, Fig. 25, it releases rod M4 so that the spring M6, Fig. 8, presses the rod M4 against the friction pad M7 in the block M1 and thereby clamps the bar M to the frame.

A quadrant C, mounted on ball bearings centrally of the frame, Fig. 6, is provided with internal gear teeth C1, the pitch line of which is spaced from the center 0 a distance equal to the distance of the center of the pin A9 from the center 0. A spring C2, Fig. 5, urges this quadrant clockwise relative to wheel A and its movement in that direction is limited by a stud on the quadrant contacting with a stop F3 on the frame, Fig. 6.

The quadrant C is clutched to the wheel A when it is desired to move them together. Pivoted at C3, Fig. 6, to the quadrant C is a clamping lever C4 having a friction pad C5. These parts project down into and lie in a groove A12 in the wheel A. The other end of the lever C4 has a vertical pin C6 which projects upward through a slot C37 in the plate C30 fastened to quadrant C. A spring C81 pulls on pin C6 to withdraw the clamping lever and friction C5 from the side of the groove A12 in wheel A. To set the clamp, a cam C8, pivoted at C9 in the plate C30, is pressed against the pin C6 by the rocking of a lever C10 pivoted at C11 on the frame F. The lever C10 is rocked by the rising of a rod C12, which has at its upper end a pin C13 which raises the right end of lever C10 and depresses its left end to set the clamp. The hub of the cam C8 is provided with ratchet teeth C20 which are engaged by a pawl C21 pivoted to plate C30 and pressed into engagement with the teeth by a spring C22. The pawl locks the cam C8 in clamping position, so that the rod C12 and the lever C10 may be returned to neutral position without releasing the clamp.

To release the pawl C21 and thereby the cam C8 and the clamp, the rod C12 is depressed thereby moving down the pin C13 to depress the end of lever C17 pivoted at C18 to the frame. The lever C17 depresses the tail of the pawl C21 to rock the pawl and disengage it from the teeth C20 on the hub of the cam C8. The spring C81 then pulls the pin C6 to lift the lever C4 and the friction pad C5 out of contact with the side of the groove A12 in the wheel A.

A segment B, Fig. 6, is pivoted on a pin A40 on the wheel A, the center of this pin being at a distance from 0 equal to one-half of the distance from 0 to the pitch line of the gear teeth C1. The quadrant C has an arcuate slot C40 through which the pin A40 projects so that the pin may move relative to the quadrant as is necessary in the operation of the instrument.

The segment B has gear teeth B1 on its periphery which mesh with the internal gear teeth C1 of the quadrant C. On the left end of the segment B is a pin B2, the axis of which, when the parts are in their zero position, is over the common pitch line of the meshing gear teeth B1 and C1 and on a line through the centers A9, 0 and A40 extended. This pin B2 controls the movement across the instrument of a second straight-edge means, as here shown a bar P. As an alternative or equivalent construction for the two straight-edge means shown in the drawings, M and P, or either of them, any other means for suitably delineating intersecting lines may be employed, for example, suitably mounted tightly stretched wires, transparent members carrying an indicative line, or optical means such as light-projecting devices whereby a straight indicative line is provided.

The bar P, Fig. 7, has at its lower end a block P1 provided with rollers P11 to slide transversely in guides P12 on the frame. The bar has a slot P2, Fig. 9, in its bottom surface into which the pin B2 on the segment B projects, so that the turning of the segment B about the pin A40 moves the bar P bodily transversely.

The bar P has a part P13 fixed thereon on blocks, thereby providing a slot between the parts, in which the bar M may reciprocate.

On P13 is an engraved line P4 above and parallel to the slot P2, Fig. 7. This line P4 is offset from a line which is parallel to the length of the bar and passes through the extended axis of the pin B2. I call this line the indicative line of bar P. The engraved line P4 is offset to the left from the indicative line by such a distance that when the line P4 is seen through the eye tube R, as will be described, as tangent to the reticle R11, Fig. 12, the indicative line (shown in dot and dash) passes through the center of the reticle. As the reticle is a circle the offset distance of the line P4 from the indicative line is equal to the radius to the outer circumference of the reticle.

A slave ring J, Fig. 5, concentric with 0, is mounted on ball bearings on the frame F. This ring is rigidly connected by a post J1 to the wheel A and is in effect a part of wheel A.

The ring J may be marked, Fig. 4, with a circular scale divided into 180 degrees for each semi-circumference, so that a pointer S, fast on the frame, indicates the number of degrees by which the wheel A is turned clockwise or anticlockwise from the zero mark to which the pointer points when the wheel A is in its zero position.

A ring K, Figs. 4 and 5, concentric with 0, is mounted on ball bearings on the ring J. It is provided with parallel parts K1 and K2 on which an eye tube device, to be described, is mounted so as to be slidable radially.

A clamp is provided to clamp the ring K to the frame and another clamp to clamp the ring K to the ring J.

To clamp the ring K to the top plate F41 of the frame, two triangular clamp plates K40 and K41, Fig. 4, are pivoted to the ring K. To each of these plates is pivoted a link K42, which is pivoted to the end of a cross bar K43. The cross bar is urged upward to release the clamp plates by a spring K45 embracing a pin which holds the spring between the cross bar and block K46 fixed on a part K47 of ring K. A cam K50 is fixed on a pin K51 journaled in the prongs of a clevis K49 slidable on the upper surface of K47. The cam K50 may be turned by the handle K52 to depress the cross bar K43 to press the clamp pieces K40 and1 K41 against the frame. Also, the turning of the cam K50 moves the clevis K49 and the pin K54 to press the pin against the frame plate F41. Thus the movement of the handle K52 in one direction clamps the ring K to the frame at three places and its movement in the other direction releases it.

To clamp the ring K to the slave ring J a lever K60 is pivoted at K61 on a part of the ring K. The short end of the lever, which is provided with a clamping friction pad, is urged against the ring J by a spring K62. A handle K64 is fixed to a pin journaled in a bracket on a part of the ring K. Also fixed to the pin is a cam K65. The operator, by turning the handle K64, can clamp the ring K to the ring J, or can release ring K from ring J.

An eye tube R, Fig. 5, is mounted to slide on the parts K1 and K2 of the ring K. A vertical tube R4, Fig. 10, is screwed into a base R6 provided with lugs having holes through which pass the rods K30, Fig. 5, fastened in ears on the parts K1 and K2, so that the eye tube R may be slid radially on the ring K. At the top of the cylinder R4 is a gimbal R3 for so holding the top of the tube R that its lower end is capable of universal motion substantially in a horizontal plane. Mounted on the tube R4, Fig. 10, is a ring R7 which may be turned by hand. The inside of this ring has an eccentric hole. Between the edge of the hole and a collar R9 on the tube R is a ball R11. By turning the ring R7 the bottom of the tube may be adjusted crosswise against the stress of a spring R13. Another similar ring R8 with a ball, etc., is disposed at right angles, so that by turning the ring R8 the lower end of the tube R may be adjusted at right angles to the other adjustment. By turning both rings the lower end of the tube may be universally adjusted substantially in a plane.

The tube R contains a glass R10 having marked on its upper surface, which is ground, a small circle or reticle R11, Fig. 12. Glass R10 is covered by a plain glass. The tube also contains lenses R14 which reflect the real image of the object in focus on the ground surface of the glass R10. The universal adjustment of the lower end of the tube R so positions it that the image of the object may be brought into coincidence with the reticle. At the top of the tube R there is a magnifying lens R20, Fig. 10. Provision is made for artificially lighting the object by means of a small incandescent bulb to which current is supplied through the wire from an ordinary flashlight battery as shown in Figs. 4 and 5.

Preparatory to operation, the instrument is in zero position, Fig. 4, with the pointer S reading 0° on the scale on ring J.

The declination $d$ and the local hour angle $t$ of the celestial body are determined in the usual manner and likewise the dead reckoning, or assumed, latitude $l$ of the observer.

The general mode of operation is as follows:

The first procedure is to locate the point G, Fig. 1, which represents the projection on the observer's meridian plane of the ground point of the celestial body.

Figure 14:
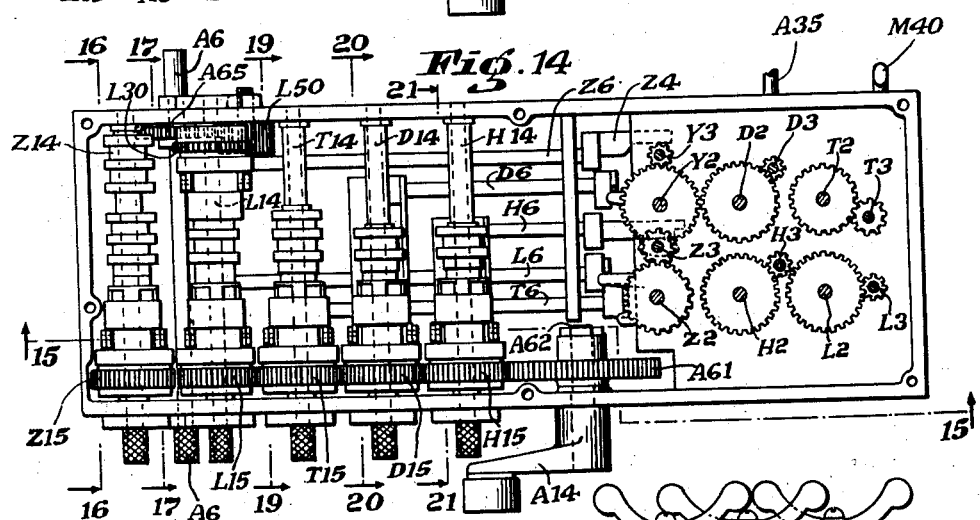
Fig. 14 is a plan view on the line 14—14 of Fig. 15.

For this purpose the wheel A, after being unlocked by the operation of the rod C35, is turned clockwise through an angle equal to the declination $d$ (not to exceed 80°) of the celestial body by the operation of the crank A14, Fig. 14.

Thereby the pin A9, Fig. 4, moves the bar M downward against the pull of its spring to a position in which the engraved indicative line M0 over the axis of the pin assumes the position M2 in Fig. 1. The bar M is then clamped in that position by operating the rod M4.

Inasmuch as the quadrant C is free from wheel A, it is held in its zero position, Fig. 6, by its spring C2 against the stop F3. But the pin A40 on wheel A is moved clockwise in the slot C40 and, inasmuch as the segment B is geared at B1, C1 to the quadrant, the movement of the wheel A turns the segment anticlockwise about A40 to move the pin B2 in a straight line towards 0 to a position in which its axis is at B21, Fig. 1, where the distance from 0 to B21 is equal to cos $d$.

The quadrant C is then clamped to the wheel A by operating the rod C12. The wheel A and the quadrant are rotated anticlockwise by the crank A14 through an angle which, from the line Q, Q1, is equal to the local hour angle $t$, Fig. 1.

In this movement the segment B is moved bodily in unison with wheel A anticlockwise so that the axis of its pin B2 is moved on a radius equal to cos $d$ from the point B21 to the point B22, and the bar P, moved by the pin B2 in its slot P2, is brought to the position in which its indicative line is the line P3 of Fig. 1.

The intersection of the indicative lines of the bar M and P fixes the point G, Fig. 1, which is the projection on the observer's meridian plane of the ground point of the celestial body.

The eye tube R on the ring K is brought to a position in which the image of the engraved indicative line M0 on the bar M is seen as passing through the center of the reticle R11, Fig. 12, and the engraved line P4 on the bar P is seen as tangent to the left side of the reticle and the indicative line of bar P passes through the center of the reticle. This is done by turning the ring K, moving the tube R radially on the rods K30 and adjusting the lower end of the tube by rings R7 and R8.

The ring K is then clamped to ring J by the operation of the handle K64 and thereby to wheel A, Fig. 4.

The next procedure is to locate the point E, Figs. 1 and 2, or the point E1, Fig. 3.

In the case in which the declination $d$ of the celestial body and the latitude $l$ of the observer are of the same name, the wheel A is turned anticlockwise by the crank A14 through an angle equal to the co-latitude (90°—$l$) of the observer, rotating with it the ring K carrying the eye tube R to the point E of Figs. 2 and 3.

The ring K is clamped to the frame F by operating the handle K52 and is unclamped from the ring J (and the wheel A) by operating the handle K64.

The quadrant C is unclamped from the wheel A by operating the rod C12, Fig. 6, and is returned to zero position against the stop F3 by the spring C2. The wheel A is returned to zero position by the crank A14, thereby returning the segment B and the bar P to zero position. The bar M is released by operating the rod M4 and is moved to zero position by its spring. Thereby all the parts are restored to zero position, except the ring K and the eye tube R carried thereby.

The next procedure is to measure the altitude $h$ of the celestial body. For this purpose the wheel A is rotated clockwise by the crank A14 until the engraved indicative line M0 on the bar M, held by its spring against the pin A9, is seen through the eye tube R as passing through the center of the reticle R11. This brings that line to the position M5 in Fig. 2. The degrees and minutes, through which the wheel A is thus rotated, is the altitude $h$ of the celestial body, as shown in Fig. 2.

The turning of the wheel A clockwise in this operation, while the quadrant C is held in zero position by the spring C2, rotates the segment B anticlockwise about its center pin A40, Fig. 6, and moves pin B2 in a straight line toward 0 to a position, Fig. 2, where the distance 0, B23, the axis of the pin, is equal to cos $h$.

The next procedure is to measure the azimuth $z$ of the celestial body.

The quadrant C is clamped to wheel A by operating rod C12, Fig. 6.

The wheel A is turned anticlockwise by the crank A14 and with it the quadrant C and the segment B until the axis of the pin B2 is brought to the position, B24, Fig. 2, in which the engraved line P4 on bar P is tangent to the left side of the reticle as seen through the eye tube R. This brings the indicative line of the bar into the position P6 in Fig. 2. The angle traversed from zero by the wheel A is equal to 180° minus the azimuth $z$, i. e., $z$ equals 180° minus that angle.

In the case in which the declination of the celestial body, $d$, and the latitude $l$ of the observer are of opposite names, the eye tube R is located with reference to the point G as above described. The ring K is released from the frame and is clamped to wheel A (through ring J). It is rotated anticlockwise through an angle equal to 90°+$l$, thereby bringing the eye tube to the point E1, Fig. 3. As before, the ring K is then clamped to the frame and released from wheel A and the other parts are restored to their zero position.

The same procedure, as before, is then followed to move the bar M by turning the wheel A to such position that its engraved indicative line M0 is the line M5 passing through the point E1 in Fig. 3, thereby determining the angle $h$, the altitude of the celestial body.

Then the same procedure, as before, is followed to move the bar P to such position that its engraved line P4 is tangent to the left side of the reticle, Fig. 12 and its indicative line is the line P6 in Fig. 3, thereby determining the angle $z$, Fig. 3, which is the azimuth of the celestial body measured from the elevated pole.

Figure 13:
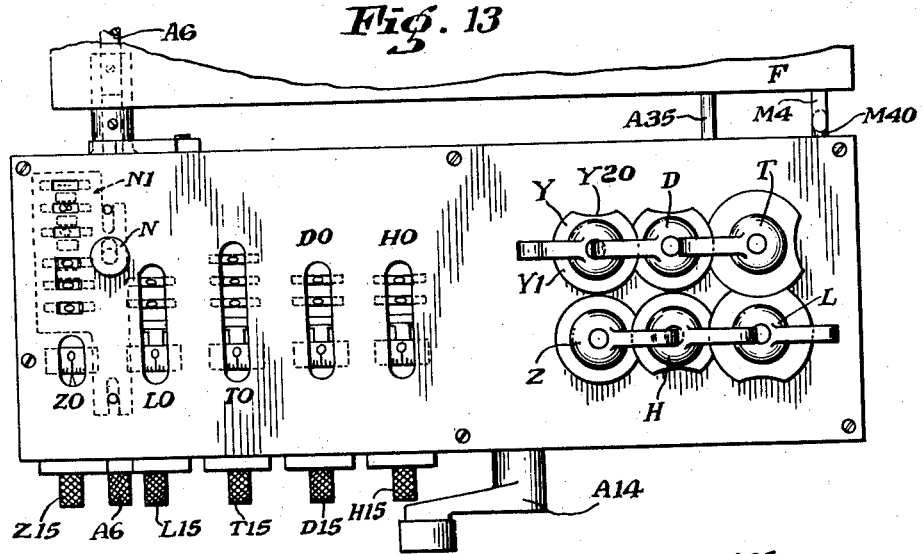
Fig. 13 is a top plan view of the counter devices.

I have provided counter mechanism and means to operate it, shown in Figs. 13-26, by which the instrument may be operated by turning six knobs Y, D, T, L, H and Z, by moving a knob N, by turning the crank A14, Fig. 13, and by operating the levers K52 and K64, Fig. 4. At the end of an operation the given data, the declination $d$ and the local hour angle $t$ of the celestial body and the latitude $l$ of the observer are shown on the counters respectively D0, T0 and L0, Fig. 13, and the resulting data, the altitude $h$ and the azimuth $z$ of the celestial body, are shown on the counters H0 and Z0. Thus the operator has before him on the counters all the data involved in an operation of the instrument.

The counter mechanism is controlled in part by six knobs Y, D, T, L, H and Z, Fig. 13, which are provided with handles by which they may be turned separately by the operator. Each knob, for example knob Y, is provided with a circular plate, such as Y1, which has on its periphery one or two arcuate recesses such as Y20. As shown in Fig. 13, all the knobs, except Y, are locked; D is locked by the periphery of Y being in the recess on the left of D; T is locked by the periphery of D being in the recess on the left of T; L is locked by the periphery of T being in the recess at the top of L; H is locked by the periphery of L being in the recess at the right of H; and Z is locked by the periphery of H being in the recess on the right of Z. The arrangement is such that a quarter clockwise turn of a knob, beginning with Y, releases the next knob so that all the knobs may be turned in succession but none can be turned out of its proper sequence. After all the knobs have been turned clockwise they may be turned anticlockwise to their starting positions in reverse succession beginning with Z.

Figure 22:
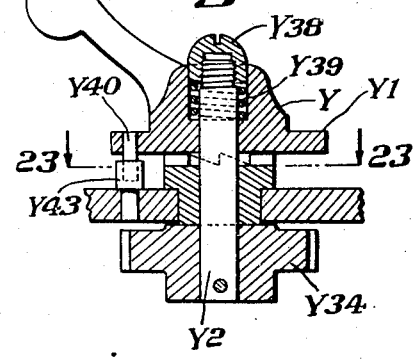
Fig. 22 is a vertical cross-section of the Y knob.
Figure 23:
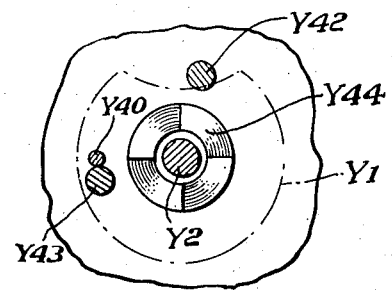
Fig. 23 is a plan view on the line 23—23 of Fig. 22.

The turning of a knob, for example knob Y, clockwise turns a gear, such as Y34, fast on a shaft Y2, Fig. 22. (All the knobs are of the same construction in this respect.) A ratchet on the bottom of the knob engages a ratchet Y44 fast on the shaft. A cap nut Y38 is screwed down on the upper end of shaft Y2 and compresses a spring Y39 against an annular shoulder on the knob to cause the ratchets to engage when the knob is turned clockwise, but permits the ratchet on the knob to slip over the ratchet on the shaft when the knob is turned anticlockwise, so that the shaft and the gear are not then turned. A pin Y40, depending from the plate Y1, abuts against a stop Y42 on the frame when the knob is turned clockwise and against a stop Y43 on the frame when the knob is turned anticlockwise, Fig. 23.

Let it be assumed that an operation of the instrument has been completed and the counters Z0, L0, D0 and H0, Fig. 13, show the readings of the operations and that all the knobs Y, D, T, L, H and Z have been turned clockwise a quarter turn.

To prepare the instrument for a new operation, the operator turns all the knobs anticlockwise to the positions shown in Fig. 13 and he turns the shafts L14, T14, D14 and H14 of the counters by their knurled ends so that the counters read zero. This is possible because all of these shafts are free from their clutches and are held from rotation merely by friction, as will be described. Shaft Z14 only is still clutched, Fig. 16.

The operator turns knob Y clockwise a quarter turn.

The effects are:

(1) The shaft Z14 is unclutched.

(2) The quadrant C is unclamped from the wheel A so that it is returned to zero position by its spring, and (3) The mechanism, which locks the wheel A, when in zero position, is released for action.

The turning of knob Y and shaft Y2 a quarter turn clockwise, Fig. 13, turns shaft Y3 a full turn anticlockwise, Fig. 14.

Figure 25:
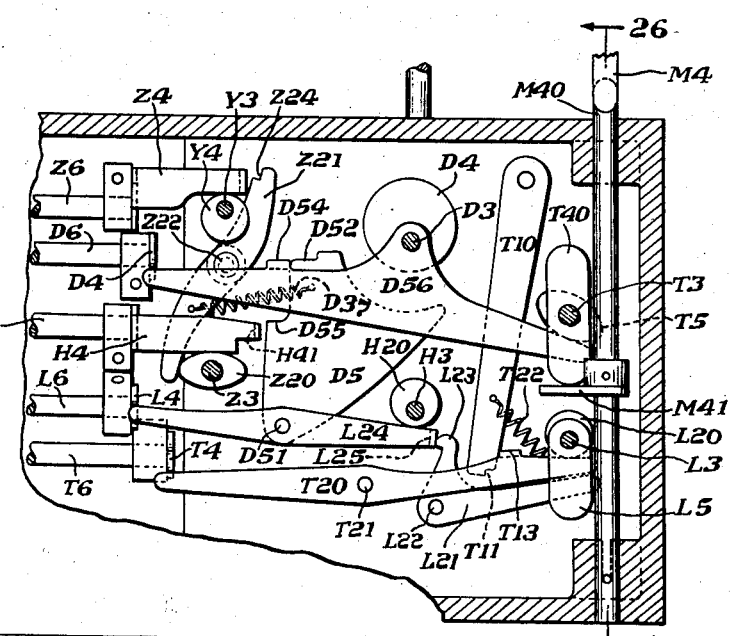
Fig. 25 is a plan view on the line 25—25 of Fig. 15.
Figure 26:
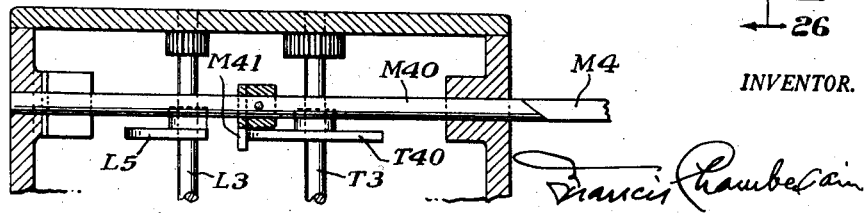
Fig. 26 is an elevation on the line 26—26 of Fig. 25.

(1) The eccentric Y4 on shaft Y3, Fig. 25, lifts the arm Z4 extending from an arm on the shaft Z6 to rock that shaft anticlockwise, Fig. 16. The rocking of shaft Z6 pulls the lever Z7, pivoted on an arm on said shaft, to the left. This rocks the clutch yoke Z8, pivoted at Z9 on the frame, to the left and moves the clutch Z10 against the stress of the spring Z11 to disengage it from the clutch cone Z12 which is fast to the gear Z15. This releases the shaft Z14, which is the azimuth countershaft, from the gear Z15.

The clutch, when drawn back, contacts with a friction stop Z19 which holds shaft Z14 from rotating until turned by the operator.

The operator, by means of knurl on the end of the shaft Z14, returns that shaft to zero position, so that all the counter shafts are now at zero.

The hub Z41 of the clutch has a sliding spline engagement with the periphery of the hub Z42 which is fast on shaft Z14.

On the periphery of the hub Z41 is a scale of sixty divisions representing the number of minutes through which the shaft is turned in one revolution. By mechanism, which is not shown as it is well known in this sort of counter, when the shaft Z14 and hub Z42 complete one revolution, a recessed disc on the hub picks up the unit degree counter Z01 and causes it to advance one-tenth of a revolution, and when the unit degree counter completes one revolution it picks up the tens degree counter Z02 and causes it to advance one-tenth of a revolution, and when the tens degree counter completes one revolution it picks up the hundred degree counter Z03 and causes it to advance one-tenth of a revolution. Counter wheels Z01, Z02 and Z03 are loose on shaft Z14.

The hub Z04 is fast on shaft Z14 and at the completion of one revolution a recessed disc on the hub picks up the unit degree counter Z05 and causes it to advance one-tenth of a revolution. Similarly the tens degree counter Z06 and the hundred degree counter Z07 are advanced one-tenth of a revolution. Counters Z05, Z06 and Z07 are loose on shaft Z14.

The clutch devices on the other shafts D14, T14, L14 and H14 of the counters are the same as the clutch on Z14, except that the clutch device on L14 has two clutches one on the left and the other on the right, as will be described.

Figure 24:
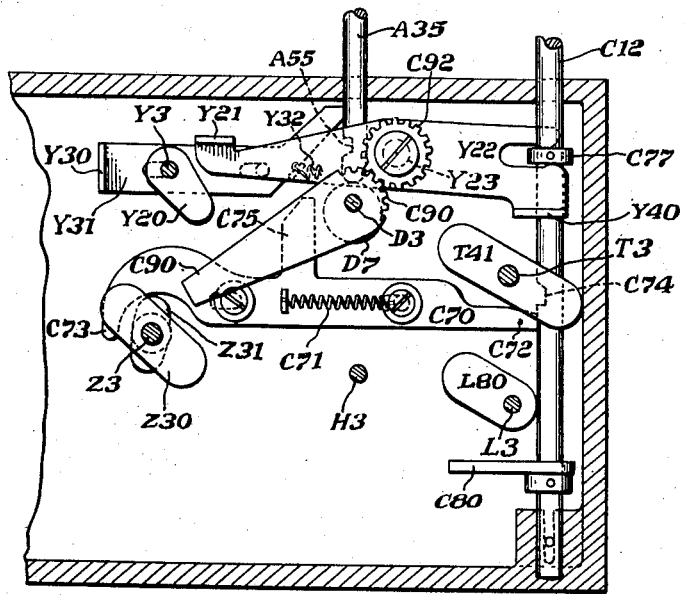
Fig. 24 is a plan view on the line 24—24 of Fig. 15.

(2) When the knob Y and the shaft Y3 are turned, as above stated, cam Y20, fast on shaft Y3, Fig. 24, strikes the flange Y21 on the left end of lever Y22, pivoted at Y23 to the frame, to move down the right end of lever Y22. Projections on the right end of lever Y22 engage a collar C77 on the rod C12 and move that rod down. This movement of rod C12, Fig. 6, pulls down the right end of lever C17 to release the pawl C21 from the ratchet C20, thereby releasing the lever C8 so that the left end of lever C4 on the quadrant C is lifted by the spring C81, whereby the quadrant is released from the wheel A and is returned to zero by its spring C2, Fig. 5.

Rod C12 is locked in its lower position by the slide C70, Fig. 24, which is impelled to the right by its spring C71 so that the right end C72 of the slide enters the notch C74 in the rod C12.

(3) The cam Y20, Fig. 24, also strikes the flange Y30 on the slide Y31 to move the slide to the left, against the tension of a spring Y32, to disengage its right end from the notch A55 in the rod A35. Then, when the operator turns the crank A14, Fig. 13, to return wheel A to zero position, the spring A33, Fig. 6, pulls the lever A24 to the left and the pin A22 locks the worm shaft A6 and the wheel A.

The instrument is now ready for a new operation.

According to whether the latitude of the observer and the declination of the celestial body are of the same name or of opposite names, the operator moves the knob N to the left or to the right, Fig. 17, as will now be described.

It is convenient to set the knob N, before the instrument is operated, to provide either for the condition (1) when the latitude *l* of the observer and the declination *d* of the celestial body are of the same name, or for the condition (2) when they are of opposite names.

Assume that condition (1) exists. The knob N, shown down in Fig. 13, is moved up in that figure, or to the left in Fig. 17. The knob moves the shutter N1 to the left, Fig. 17, and up in Fig. 13, to bring the three upper openings in the shutter opposite the upper figures on the azimuth counter Z0 which are marked respectively 1, 8 and 0, representing 180°, and to cover the three lower figures on the azimuth counter.

The movement of the knob N and the shutter N1 to the left moves the member N3 to the left, Fig. 17, so that its depending arm N4 is moved away from the stop L44 on the clutch lever L32 and thereby will permit the clutch L16 to be moved to the left to engage the clutch cone secured to the gear L38 in the operation of the instrument to be described. And the depending arm N5 is moved against the stop L45 on the clutch lever L33 and thereby prevents the clutch L17 from being moved to the right and from engaging the clutch cone L19 on gear L15. The latitude counter L0, Fig. 13, is or has been set to 00° by the operator's turning the shaft L14 by its knurled end, Fig. 17.

If the condition is (2) that the latitude of the observer and the declination of the celestial body are of opposite names, the knob N is moved down, as shown in Fig. 13, or to the right as shown in Fig. 17. Thereby the shutter N1 is moved down, Fig. 13, to cover the upper set of figures on the azimuth counter Z0 and to expose the lower set of figures which then read 000.

The movement of the knob N to the right moves the member N3 to the right, as shown in Fig. 17. The arm N4 then is against the stop L44 and prevents the movement of clutch L16 to the left and the arm N5 is moved away from the stop L45 and permits the engagement of clutch L17 with the clutch cone L19 on gear L15, as will be described. The operator turns or has turned the shaft L14 so that the latitude counter L0, Fig. 13, reads 00°.

The next step is to prepare the instrument to indicate the declination on the declination counter D0. This is done by the operator's turning knob D, Fig. 13, a quarter turn clockwise thereby turning the shaft D3 a full turn anti-clockwise, Fig. 14.

The effects are:
(1) To engage the clutch on the declination shaft D14.
(2) To engage the clutch on the altitude shaft H14.
(3) To return the rod C12 to neutral position, and
(4) To unlock the worm shaft A6 so that the wheel A may be turned by the crank.

(1) The cam D4 on shaft D3, Fig. 25, strikes the right end of lever D5, pivoted to the frame at D51, and rocks that lever clockwise. This removes the end D52 of that lever from beneath the projection D54 on lever D56, pivoted at D3, and permits the left end of lever D56 to be moved down, as shown in Fig. 25. This permits the arm D4 on shaft D6 to move downward and the shaft D6 to rock clockwise, Fig. 20, under the stress of the clutch spring (not shown but similar to the spring Z11, Fig. 16) and to allow the clutch lever D8, pivoted at D9 on the frame, to move to the right and to cause the clutch D10 to engage the clutch cone D12 on the gear D15. The gear D15, Fig. 14, is one of a chain of meshing gears L15, T15, D15, and H15, the last meshing with the gear A61, mounted on a stub shaft A62, to which gear the crank A14 is fastened.

When the crank and gearing are turned, the gear L15, meshing with the gear A64, fast on worm shaft A6, Fig. 17, turns the wheel A.

Figure 21:
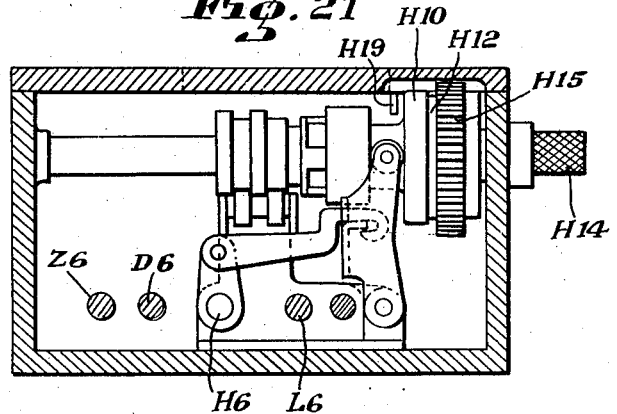
Fig. 21 is an elevation on the line 21—21 of Fig. 14.

(2) Also, when the lever D5 is rocked, as above described, its shoulder D55, Fig. 25, is withdrawn from beneath the projection H41 on the end of the arm H4 secured to an arm projecting from the shaft H6, thereby permitting the shaft H6 to be rocked clockwise, Fig. 21, under the stress of the clutch spring (not shown) to move the clutch H10 into engagement with the clutch cone H12 on the gear H15.

(3) The cam D7, Fig. 24, on the shaft D3 strikes the arm C75 of slide C70 to move it to the left and withdraws its end C72 from the notch C74 in the rod C12, so that the rod is brought to neutral position by the spring C14, Fig. 6.

(4) The cam D7, Fig. 24, also lifts the rod A35 to withdraw the pin A22, Fig. 6, from engagement with the collar A20 on the worm shaft A6, so that that shaft is unlocked and it and the wheel A may be turned by the crank.

The operator turns the crank to turn the wheel A clockwise and to rotate the declination counter shaft D14 until the degrees and minutes of the declination $d$ appear in the openings over the declination counter L0, Fig. 13. Thereby the pin A9, on the wheel A, Fig. 4, moves the bar M downward to position M2, Fig. 1.

While the turning of the crank also rotates the altitude shaft H14, no account of this is taken until a later stage in the operation of the instrument, as will appear.

The next step is to prepare the instrument to show the local hour angle $t$, Fig. 2, on the counter T0, Fig. 13.

The operator turns the knob T a quarter turn clockwise, thereby turning the shaft T2 with it and turning the shaft T3 anticlockwise a half turn, Fig. 14.

The effects are:

(1) To unclutch the declination shaft D14.
(2) To engage the clutch on the local hour angle shaft T14.
(3) To clamp the bar M in position M2, and
(4) To clamp the quadrant C to wheel A.

Figure 20:
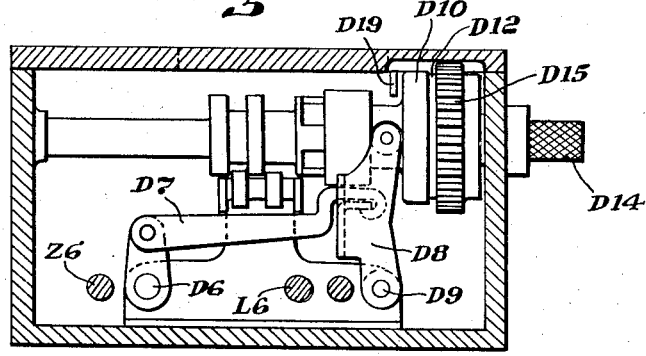
Fig. 20 is an elevation on the line 20—20 of Fig. 14.

(1) Cam T5 on shaft T3, Fig. 25, depresses the right end of lever D56, and thereby its left end is raised to lift the lever D4 and rock the shaft D6 anticlockwise, Fig. 20, to disengage the clutch D10 from the gear D15. The shaft D14, to which the clutch is splined, is held from rotation, until positively turned, by a friction pad D19 against which the clutch is pressed when moved to the left.

(2) Cam T5, Fig. 25, also strikes lever T10, pivoted at its upper end to the frame, and moves it into the position shown in Fig. 25. The notch T11 is thereby removed from above the projection T13 on the lever T20 pivoted to the frame at T21. Thereby the left end of lever T20 ceases to uphold arm T4 on shaft T6 and that shaft, Fig. 19 is rocked clockwise by the clutch spring, which causes the clutch T10 to engage the clutch cone T12 on gear T15.

(3) Cam T40 on shaft T3, Fig. 25, strikes against the arm M41 on the rod M40 to withdraw its beveled end from beneath the beveled end of the clutch rod M4 to permit the rod to be moved down by the spring M6, Fig. 8, thereby clamping the bar M with its engraved indicative line in position M2, Fig. 1.

(4) Cam T41, Fig. 24, strikes against the flange Y40 on the right end of lever Y22 to raise it and the rod C12. Raising the rod C12, Fig. 6, moves down the left end of lever C10 and clamps the lever C4, pivoted on the quadrant C, to the wheel A, so that, when the wheel A is turned the quadrant C will turn with it. After the rod C12 has been raised, as just above described, the cam T41, Fig. 24, passes out of engagement with the flange Y40 and the spring C14, Fig. 6, returns the rod C12 to neutral position.

The operator turns the crank, Fig. 14, to rotate the wheel A and quadrant C anticlockwise thereby rotating the shaft T14 until the counter T0, Fig. 13, shows the degrees and minutes of the local hour angle $t$. In this operation on the segment B, Fig. 6 is carried bodily anticlockwise about the center 0 to move the pin B2 so that its axis is carried from position B21 to B22, Fig. 1, and thereby the bar P is moved to the right to bring its indicative line into position P3.

The operator by turning the ring K and moving and adjusting the eye tube R brings the eye tube into the position, shown in Fig. 12, in which the engraved indicative line M0 on the bar M passes through the center of the reticle R11, Fig. 12, and the engraved line P4 on the bar P is tangent to the left side of the reticle and the indicative line of the bar passes through the center of the reticle. Thereby the eye tube is brought over the point G, Fig. 1, which is the point of intersection of the indicative line of bars M and P.

The operator next turns lever K64, Fig. 4, to clamp ring K to the slave ring J and also to wheel A, as ring J and wheel A are connected together by the post J1, Fig. 5.

Inasmuch as the next operation of the instrument is to move the eye tube from the point G, Fig. 1, to the point E in case the declination of the observed celestial body and the latitude of the observer are of the same name, Figs. 1 and 2, or to the point E1, Fig. 3, if they are of opposite names, the operator moves the knob N either to the right, Fig. 17, or to the left, and sets the latitude counter L0 to read 00° unless he has already done so, as above described.

The next step is to prepare the instrument so that the latitude counter L0, Fig. 13, will indicate the degrees and minutes through which the wheel A is turned to bring the eye tube R to the point E, Figs. 1 and 2, or to the point E1, Fig. 3.

The operator turns knob L, Fig. 13, and its shaft L2 a quarter turn clockwise, thereby likewise turning shaft L3, Fig. 14, a full turn anticlockwise.

The effects are:

(1) To unclutch the shaft T14.
(2) To engage the appropriate clutch on shaft L14.
(3) To release the bar M, and
(4) To unclamp quadrant C from wheel A.

(1) Cam L20, on shaft L3, Fig. 25, moves down the right end of lever T20. This raises the left end of lever T20 to lift arm T4 on shaft T6 and rock the shaft anticlockwise, Fig. 19, to disengage the clutch T10 from the clutch cone and gear T15. The clutch and the shaft T14 are held by the friction T19. The projection T13 on lever T20, Fig. 25, is engaged by the notch T11 in the lower end of lever T10, which is pulled by a spring T22 to the right, to hold down the right end of lever T20.

(2) Cam L20 also moves down the right end of lever L21, pivoted to the frame at L22, to withdraw its upper end L23 from the flange L25 on lever L24, pivoted to the frame at D51. This permits the left end of lever L24 and the arm L6 to fall and the shaft L8 to turn clockwise, Figs. 17 and 18, under the stress of one of the clutch springs (not shown) on shaft L14.

(3) Cam L5, Fig. 25, strikes against and lifts arm M41 on rod M40 to push its beveled end under the beveled end of rod M4 to raise M4, Fig. 9, and thereby release the bar M.

(4) Cam L80, Fig. 24, strikes against and moves down the arm C80 and the rod C12. This moves down the lever C17, Fig. 6, so that when the tail of the pawl C21 strikes lever C17, as it will when the quadrant C is turned anticlockwise in the next operation of wheel A and the quadrant, the pawl will be released from the ratchet C20 and the spring C81 will release the clamping lever C4 from the wheel A, thereby disengaging the quadrant from the wheel. The rod C12, Fig. 24, is locked in its down position by the end C72 of slide C70 entering the notch C74, due to the pull of the spring C71.

In the case in which the declination of the celestial body and the latitude of the observer are of the same name, the knob N, Fig. 17, has been moved to the left and the latitude counter shaft L0 has been set to read 00°, as above described. In such case the left clutch spring (not shown) on the shaft L14 moves the left clutch L16 into engagement with the clutch cone L18 on gear L30. The spring rocks the lever L32, pivoted to the frame at L34, to the left and also lever L36, pivoted at L34, to the left. The hub of lever L36 has an arm L38 provided with a slot into which extends a projection L40 on lever L42 also pivoted at L34.

Lever L42 has teeth on its segmental end which engage with the teeth on a segment L62 fast on shaft L6. By these means the clutching action of the left spring rocks the shaft L6 clockwise.

Lever L38 has teeth on its segmental end which engage the teeth on the segmental end of lever L39, pivoted on the frame at L35, and when the toothed end of lever L39 rises, its arm L37 is rocked to the right. But this has no effect on the clutch arms L33 which are held from movement to the right by the projection N5 on member N3.

Figure 15:
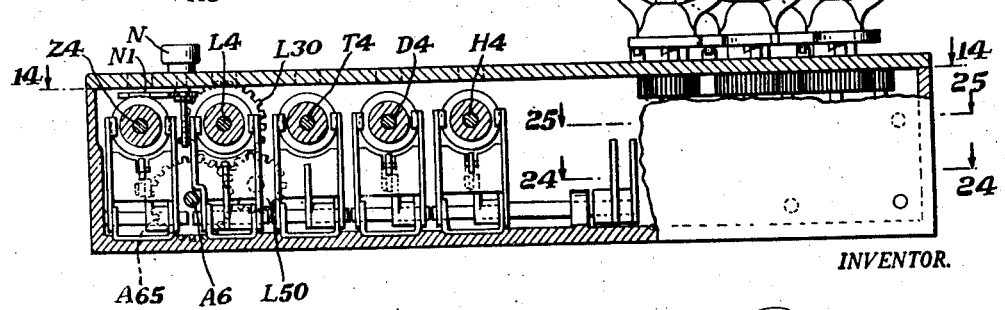
Fig. 15 is an elevation on the line 15—15 of Fig. 14.

The gear L30 meshes with a gear L50 journaled on a stub shaft L51 secured to the frame, and the gear L50 meshes with a gear A65, Fig. 15, fast on shaft A6. Thus the shaft L15 may be turned by the operator's turning the crank A14 to indicate the anticlockwise rotation of the wheel A 90°−$l$ ($l$ being the latitude of the observer), when the declination and the latitude are of the same name, Fig. 1.

The operator turns wheel A by the crank A14, Fig. 14, and with it the ring K anticlockwise until the latitude counter L0 reads the latitude $l$ of the observer. This turns the wheel A through the angle 90°−$l$, because the counter wheel L02, Fig. 17, loose on the shaft L14, has nine digits, 0 to 8 (instead of the usual ten on such a wheel) and turns reversely, i. e., from 0 to 8 to 7, etc., in this operation.

The rotation of the ring K brings the eye tube R to the position E, Fig. 1.

The operator turns lever K52, Fig. 4, to clamp ring K to the frame and turns lever K54 to release ring K from slave ring J and wheel A.

The next step is to prepare the instrument to indicate the altitude $h$ on the altitude counter H0, Fig. 13.

The operator turns the knob H a quarter turn clockwise and likewise the shaft H2, thereby turning the shaft H3, Fig. 14, a full turn anticlockwise.

The effect is:

(1) To unclutch shaft L14.

(1) Cam H20, Fig. 25, moves down the right end of lever L24 to raise its left end and the arm L4 on shaft L6, thereby turning that shaft anticlockwise, Fig. 17, and disengaging the clutch L16 from the gear L30 and releasing shaft L14.

The operator cranks the wheel A clockwise until the pin A9, Fig. 4, moves the bar M down so that its engraved indicative line M0 passes through the center of the reticle, Fig. 12, as seen through the eye tube at E, Fig. 1, thereby bringing that line on the bar into position M5. The altitude $h$, in degrees and minutes, will appear on the altitude counter H0, Fig. 13. It may be noted that the shaft H14, which carries the altitude counter, has been clutched to the gear H15 and rotated by the crank since the knob D was turned.

The next step is to prepare the instrument to indicate the azimuth $z$ on the azimuth counter Z0, Fig. 13.

The operator turns the knob Z, Fig. 13, and likewise the shaft Z2, Fig. 14, a quarter turn clockwise, thereby turning the shaft Z3 anticlockwise a half turn.

The effects are:

(1) To unclutch the shaft H14.

(2) To engage the clutch on shaft Z14.

(3) To restore lever C17 to neutral, and (4) To clamp the quadrant C to wheel A.

(1) Cam Z20 on shaft Z3, Fig. 25, lifts the arm H4 on an arm on shaft H6 to rock that shaft anticlockwise, Fig. 21. This disengages clutch H16 to release the shaft H14, which through the clutch and the friction pad H19 is held frictionally from rotation. Arm H4 is held in raised position by the shoulder D55 on lever D5, Fig. 25, engaging the flange H41 on arm H4, lever D5 being pulled anticlockwise by the spring D37, one end of which is fast to the lever D5 and the other end is fast to the lower end of lever Z21, pivoted at Z22 to the frame.

(2) Cam Z20 also rocks lever Z21 clockwise to withdraw the notch Z24 at its upper end from beneath the flange on the end of arm Z4 which arm projects from an arm on the shaft Z6. Thereupon the shaft Z6, Fig. 16, is turned clockwise by the clutch spring Z11, which causes the clutch Z16 to engage the clutch cone Z12 on gear Z15.

(3) Cam Z31 on shaft Z3, Fig. 24, strikes a depending arm C73 on the left end of slide C70 and moves the slide to the left to withdraw its right end C72 from the notch C74 in rod C12. Thereupon spring C14, Fig. 6, restores the lever C17 to neutral position.

(4) Cam Z30 on shaft Z3, Fig. 24, lifts the end of lever C90, pivoted at D3, to turn the segmental gear C99 on its right end clockwise, thereby turning the pinion C92, fast on the lever Y22, to raise the right end of that lever and the rod C12. The raising of rod C12, Fig. 6, moves down the left end of lever C10, thereby depressing the arm C8 and the clamp C4 to clamp the quadrant C to the wheel A. The rod C12 is returned to neutral position by the spring C14.

It will be noted that the upper openings show the azimuth counter Z0, Fig. 13, reading 180°, the shutter N1 being in its upper position to expose the upper counters and cover the lower counters.

The operator turns the crank to rotate to wheel A and quadrant C anticlockwise, thereby carrying the segment B bodily anticlockwise about the center 0, Fig. 6. This moves the pin B2 on B anticlockwise and its axis from position B23 to position B24, Fig. 2, and the pin B2, being in the slot P2 of the bar P, Fig. 7, moves the bar P to the right until its engraved line P4 is tangent to the left side of the reticle R11 when seen through the eye tube R and the indicative line of the bar P is in position P6, Fig. 2. The reading on the upper azimuth counter Z0, Fig. 13, is the azimuth z of the celestial body measured from the elevated pole.

This completes the operation of the instrument with the declination, the local hour angle, the altitude and the azimuth of the observed celestial body and the latitude of the observer shown on their respective counters in the case when the declination of the body and the latitude of the observer are of the same name.

In case the latitude of the observer and the declination of the celestial body are of opposite names, the knob N is set to the right, Fig. 17, or down in Fig. 13, and the shutter N1 exposes the lower figures on the azimuth counter shaft Z0 and covers the upper figures, Fig. 13. The member N3 is moved to the right, Fig. 17. The operator sets or has set the latitude counter to 00°. These settings should be made at any time before the operation of knob L.

Then, when the knob L is turned, the shaft L6 is rocked clockwise and the right end clutch L17, Fig. 17, is clutched to the clutch cone on gear L15. The arm N4, being in contact with the stop L44, prevents the left clutch L16 from engaging the clutch cone L18.

The ensuing procedure is the same as before; the wheel A and the ring K clamped to it, are rotated anticlockwise to bring the eye tube R to the point E1, Fig. 3, by turning the latitude shaft L14, then geared to wheel A, until the latitude counter L0 reads the degrees and minutes of the latitude of the observer for the second time. The ring K is clamped to the frame and unclamped from the slave ring J and wheel A. The knob H is turned. The wheel A is rotated until the engraved indicative line on the bar M passes through the center of the reticle as seen through the eye tube, i. e., line M5 of Fig. 3. The altitude counter H0 then shows the altitude of the celestial body.

The knob Z is then operated and the operator turns the wheel A and with it the segment B and the azimuth counter Z0, then geared to wheel A, until the engraved line on the bar P is tangent to the left side of the reticle as seen through the eye tube and the indicative line of bar P passes through the center of the reticle. This moves the axis of the pin B from position B25 to position B26 and the indicative line of the bar is line P6 of Fig. 3. The counter Z0 shows the azimuth z of the celestial body as measured from the elevated pole.

In case the latitude of the observer is south, the true azimuth measured from the elevated pole may be read by shifting the knob N and the shutter N1 up to expose the upper set of figures on Z0, Fig. 13.

This completes the operation and the instrument can be prepared for another operation in the manner already described.

A modification shown in Figs. 28–32 enables a reading of the intercept to be made directly on the counter H0 in place of the altitude reading.

In such a case the shaft H140 is in all respects the same as the shaft H14, shown in Fig. 21, except that the shaft H140 is provided with two counters H141 and H142.

Counter H141, fast on shaft H140, has two sets of figures, an upper set marked, preferably in red, anticlockwise from 0 to 55 and a lower set of figures marked, preferably in black, clockwise from 0 to 55.

Counter H142, loose on shaft H140, has an upper set of figures marked, preferably in red, anticlockwise from 0 to 9 and a lower set of figures marked, preferably in black, clockwise from 0 to 9.

When the wheel A, Fig. 6, is rotated clockwise one degree, i. e., $\frac{1}{360}$ of its circumference, the shaft H140 and the counter H141 make one revolution anticlockwise. When the counter H141 has made one revolution it causes the counter H142 to make $\frac{1}{10}$ of a revolution in the same direction, thereby indicating one degree. Thus the counters H141 and H142 respectively indicate the rotation of the shaft H140 in minutes and degrees.

At the start of an operation of the instrument the shaft H140, which is unclutched from the driving gear H15, is turned by the operator so that its counters read the observed altitude in degrees and minutes.

The shaft H140 is clutched to the driving gear H15 when the operator turns the knob D, Fig. 15, a quarter turn clockwise. The shaft continues to turn, either one way or the other as before described, until after the knob H is given a quarter turn by the operator and the wheel A is then cranked clockwise until the engraved indicative line M0 on the bar M passes through the reticle, Fig. 12, as seen through the eye tube R thereby bringing that line on the bar into the position M5, Fig. 2 or 3.

Then the counters H142 and H141 will indicate the intercept, i. e., the difference between the observed altitude and the computed altitude. There will be two readings on each counter, one given by the upper or red figures and one by the lower or black figures.

As the intercept will in practice never be more than 4°, the reading is taken which is the lesser of the two. If that reading is the upper or red figures the intercept is "away," and if it is the lower or black figures it is "towards" by the number of degrees and minutes shown on the counters. If the counters read zero the computed altitude is the same as the observed altitude.

The instrument shown in Figs. 4–12 may be employed to carry out the method illustrated in Figs. 1–3, without the use of the counter mechanism shown in Figs. 13–26. In such case there is no record of the data, either given or resulting, shown by the instrument.

Figure 27:
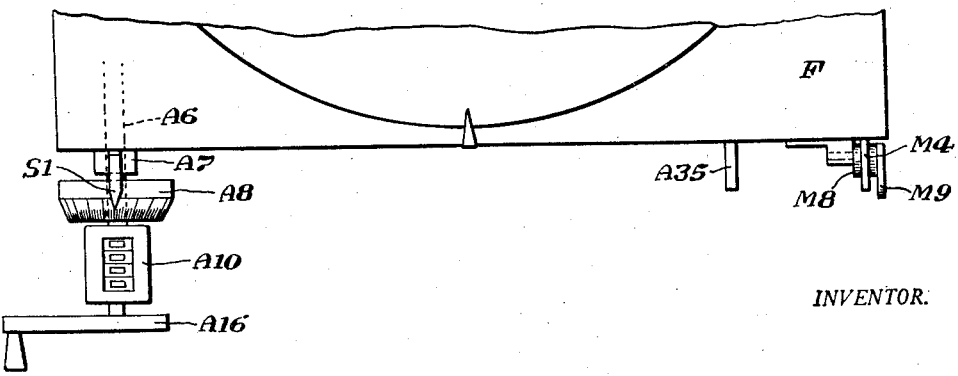
Fig. 27 illustrates means to operate the instrument without the counter mechanism.

In such case, Fig. 27, the worm shaft A6 is extended beyond the frame F and is provided with a crank A16 and with a counter A10 to indicate the number of whole turns and $\frac{1}{60}$ parts of a turn of the shaft A6 to indicate the number of degrees and minutes which the wheel A will have been turned. The rod A35 extends merely a short distance beyond the frame and may be provided with a knob for the convenience of the operator. The rod M4 likewise extends but a short distance beyond the frame and may be lifted by a lever M9 pivoted in a bracket on the frame and having a cam M8 which engages the underside of the rod M4.

Having described my invention, what I claim is:

1. An apparatus for indicating the altitude of a celestial body and the azimuth of the body, when there are given the declination and the local hour angle of the celestial body and an assumed or dead reckoning latitude of the observer, having in combination a supporting frame, an indicator wheel having worm teeth on its periphery and a pin projecting from the surface of said wheel adjacent to its periphery, a worm shaft engaging the worm teeth on said wheel, means for locking the indicator wheel in its zero position, a bar extending lengthwise across the wheel and mounted in guides so as to be capable of bodily movement at right angles to its length, means for pressing said bar against the pin on the wheel, means on said bar to indicate visibly a line parallel with said bar and passing through the axis of said pin, a clamp to clamp the bar to the frame, means to operate said clamp, a quadrant mounted concentrically with the indicator wheel and having internal gear teeth on its periphery, a clamp to clamp the quadrant to the wheel, means to operate the clamp, a spring to return the quadrant to zero position, a segment pivoted on said wheel at a distance from the center of said wheel equal to one-half the distance from the center of the wheel to the axis of the pin projecting therefrom, gear teeth on the periphery of the segment meshing with the internal gear teeth on the said quadrant, the pitch line common to said meshing gear teeth being at a distance from the center of said wheel equal to the distance from the center of said wheel to the axis of said projecting pin, a pin projecting from said segment and having its axis coincident with the common pitch line of said meshing teeth when said segment is in zero position, a second bar having its length at right angles to the length of the first-named bar and mounted in guides so as to be capable of bodily movement perpendicular to its length and having means to indicate visibly a line parallel to said bar and in a predetermined relation to a parallel line passing through the axis of said pin on said segment, said bar having a slot in its bottom surface into which said pin projects, a slave ring concentric with said indicator wheel and rigidly connected thereto, an eye tube carrying ring mounted concentrically with said wheel and capable of being turned about its center, a clamp to clamp said ring to the frame, means to operate the clamp, a clamp to clamp said ring to the slave ring and the wheel, means to operate said clamp, an eye tube mounted on a carriage slidable radially on said eye tube carrying ring and having a universal adjustment for its lower end, said eye tube containing a reticle adapted to be associated with the images of said visible means on said movable bars, and a series of counters operated by the worm shaft to indicate the number of degrees and minutes through which said wheel may be turned by the rotation of said worm shaft.

2. An apparatus for indicating the altitude of a celestial body and the azimuth of the body, when there are given the declination and the local hour angle of the celestial body and an assumed or dead reckoning latitude of the observer, having in combination a supporting frame, an indicator wheel, a shaft to rotate said wheel, a pin projecting from the surface of said wheel adjacent to its periphery, a bar extending lengthwise across the wheel and mounted in guides so as to be capable of bodily movement at right angles to its length and adapted to be moved by said pin, means on said bar to indicate visibly a line parallel with its length and passing through the axis of said pin, a clamp to clamp the bar to the frame, means to operate said clamp, a quadrant mounted to turn about the same center as the indicator wheel and having gear teeth on its periphery, a clamp to clamp the quadrant to the wheel, means to operate the clamp, a segment pivoted on said wheel at a distance from the center of said wheel equal to one-half the distance from the center of the wheel to the axis of the pin projecting therefrom, gear teeth on the periphery of the segment meshing with the gear teeth on said quadrant, the pitch line common to said meshing gear teeth being at a distance from the center of said wheel equal to the distance from the center of said wheel to the axis of said projecting pin, a pin projecting from said segment and having its axis coincident with the common pitch line of said meshing teeth, a second bar having its length at right angles to the length of the first-named bar and mounted in guides so as to be capable of bodily movement perpendicular to its length and adapted to be moved by said pin on said segment, means on said bar to indicate visibly a line parallel to its length and having a predetermined relation to a parallel line passing through the axis of said pin on said segment, a ring mounted concentrically with said wheel and capable of being turned about its center, a clamp to clamp said ring to the frame, means to operate the same, a clamp to clamp said ring to the wheel, means to operate the same, an eye tube mounted on a carriage slidable radially on said ring and having a universal adjustment for its lower end, said eye tube containing a reticle adapted to be associated with the images of said visible means on said movable bars, and counters operated by said wheel-rotating shaft to indicate the number of degrees and minutes through which said wheel may be turned.

3. An apparatus for indicating the altitude of a celestial body and the azimuth of the body, when there are given the declination and the local hour angle of the celestial body and an assumed or dead reckoning latitude of the observer, having in combination a supporting frame, an indicator wheel having worm teeth on its periphery and a pin projecting from the surface of said wheel at a given distance from the center thereof, a worm shaft having a worm engaging with the worm teeth of the wheel, means for locking the indicator wheel in its zero position, a bar extending across the wheel and mounted in slides so as to be capable of bodily movement at right angles to its length, means for pressing said bar against the pin on the wheel, means on said bar to indicate visibly a line parallel with said bar and passing through the axis of said pin, a clamp to clamp the bar to the frame, a quadrant mounted to turn about the same center as the indicator wheel and having internal gear teeth on its periphery, a clamp to clamp the quadrant to the wheel, a spring to return the quadrant to zero position, a segment pivoted on said wheel at a distance from the center of said wheel equal to one-half the distance from the center of the wheel to the axis of said pin, gear teeth on the periphery of said segment meshing with the internal gear teeth on the said quadrant, the pitch line common to said meshing gear teeth being at a distance from the center of said wheel equal to the distance from the center of said wheel to the axis of said projecting pin, a pin projecting from the segment and having its axis coincident with the common pitch line of said meshing teeth, a second bar having its length at right angles to the length of the first-named bar and being bodily movable on guides perpendicular to its length and having visible means lengthwise of the bar in predetermined relation to a parallel line passing through the axis of said pin on said segment and having a slot in its bottom surface into which projects the pin on said segment, a slave ring mounted concentrically with said wheel and rigidly connected thereto, an eye tube carrying ring mounted concentrically with said wheel and capable of being turned about its center, a clamp to clamp said ring to the frame, means to operate the same, a clamp to clamp said ring to the slave ring and to the wheel, means to operate said clamp, an eye tube mounted on a carriage slidable radially on said ring and having a universal adjustment for its lower end, said eye tube containing a reticle adapted to be associated with the images of said visible means on said movable bars, counters operated by said worm shaft to indicate the data given and the data resulting from the operation of the apparatus, namely a declination counter, a local angle counter, a latitude counter, an altitude counter and an azimuth counter, counter carrying shafts on each of which one of said counters is mounted, a gear wheel loose with relation to each shaft, a clutch on each shaft adapted to clutch the shaft to the gear wheel, the said gear wheels being so meshed together and to gearing on said worm shaft that said gear wheels rotate when said worm shaft is rotated, a crank to rotate said gear wheels and gearing, a series of rock shafts, means operated by each of said rock shafts to operate the clutch on the counter carrying shaft with which it is associated, cams to rock said rock shafts to operate said clutches, cams to operate the clamp which clamps the quadrant to the indicator wheel, cams to operate the means which locks the indicator wheel in its zero position, cams to operate the clamp which clamps the first-named bar to the frame, knobs to operate said cams and arranged in a sequence, means to prevent the operation of said knobs out of said sequence, a second clutch to clutch the latitude counter carrying shaft to a second gear wheel loose on said shaft, means to select the clutch on said shaft which may be operated and to prevent the operation of the other clutch on said shaft, a knob connected to said means to operate the same, a shutter connected to said knob to be operated thereby, said shutter in one position exposing one set of counters on the azimuth counter carrying shaft and covering another set of counters on said shaft and in its other position covering the first-named set of counters and exposing the second-named set of counters, and means connecting the second-named gear wheel on said latitude counter carrying shaft and said worm shaft for rotating said counter carrying shaft in the opposite direction to which it is rotated by the worm shaft when the first-named clutch on said shaft is engaged.

4. An apparatus for locating a point representing the intersection with the observer's meridian plane of a perpendicular to that plane passing through the ground point of a celestial body on the surface of the earth, when there are given the declination $d$ and the local hour angle $t$ of the celestial body, having in combination a supporting frame, a bar capable of bodily movement at right angles to its length, manually operable means including an indicator wheel to move said bar to a position in which a line parallel to the length of said bar is offset from the axis of said wheel by a distance equal to $\sin d$, a second bar having its length at right angles to the length of the first-named bar and capable of bodily movement at right angles to its length, manually operable means including said indicator wheel to move said bar to a position in which a line parallel to the length of said bar is offset from the axis of the wheel by a distance equal to $\cos d \cos t$, an eye tube movably mounted on said frame, and manually operable means to move said eye tube to a position over the intersection of said lines, thereby locating said point at said intersection.

5. An apparatus for locating a point representing the intersection with the observer's meridian plane of a perpendicular to that plane passing through the ground point of a celestial body on the surface of the earth, when there are given the declination $d$ and the local hour angle $t$ of the celestial body, having in combination a supporting frame, straight-edge means capable of bodily movement at right angles to its length, manually operable means including a wheel to move said straight-edge means to a position in which said straight-edge means is offset from the axis of said wheel by a distance equal to $\sin d$, a second straight-edge means at right angles to the first-named straight-edge means and capable of bodily movement at right angles to its length, manually operable means to move said second straight-edge means to a position in which said second straight-edge means is offset from the axis of said wheel by a distance equal to $\cos d \cos t$, and indicator means mounted on said frame movable to a position over the intersection of said two straight-edge means thereby locating said ground point at said intersection.

6. An apparatus for locating a point representing the intersection with the observer's meridian plane of a perpendicular to that plane passing through the ground point of a celestial body on the surface of the earth, when there are given the declination $d$ and the local hour angle $t$ of the celestial body, having in combination a supporting frame, a wheel mounted to turn about its axis, means to measure the angle through which the wheel is turned, straight-edge means capable of bodily movement at right angles to its length, manually operable means to move said straight-edge means to a position in which said straight-edge means is offset from the axis of said wheel by a distance equal to $\sin d$, a second straight-edge means at right angles to the first-named staright-edge means and capable of bodily movement at right angles to its length, manually operable means to move said second straight edge means to a position in which said second straight-edge means is offset from the axis of said wheel by a distance equal to $\cos d \cos t$, and indicator means mounted on said frame movable to a position over the intersection of said two straight-edge means thereby locating said ground point at said intersection.

7. An apparatus for locating a point representing the intersection with the observer's meridian plane of a perpendicular to that plane passing through the ground point of a celestial body on the surface of the earth, when there are given the declination $d$ and the local hour angle $t$ of the celestial body, having in combination a supporting frame, a wheel mounted to turn about its axis, means to measure the angle through which the wheel is turned, straight-edge means capable of bodily movement at right angles to its length, manually operable means including said wheel to move said straight-edge means to a position in which said straight-edge means is offset from the axis of said wheel by a distance equal to $\sin$ $d$, a second straight-edge means at right angles to the first-named straight-edge means and capable of bodily movement at right angles to its length, manually operable means to move said second straight-edge means to a position in which said second straight-edge means is offset from the axis of said wheel by a distance equal to cos $d$ cos $t$, and indicator means mounted on said frame movable to a position over the intersection of said two straight-edge means thereby locating said ground point at said intersection.

8. An apparatus for indicating the altitude of a celestial body, when there are given the declination $d$ and the local hour angle $t$ of the celestial body and an assumed or dead reckoning latitude $l$ of the observer, having in combination a supporting frame, a wheel, means to turn said wheel, two bars at right angles to one another, each capable of bodily movement at right angles to its length, means to move said bars to mutual positions in which a line parallel to the length of one bar and associated therewith is offset from the axis of the wheel by a distance equal to sin $d$ and a line parallel to the length of the other bar and associated therewith is offset from the axis of the wheel by a distance equal to cos $d$ cos $t$, said lines intersecting, an eye tube, means to move said eye tube first to a position over the intersection of said lines and then to a second position at the same radial distance from the axis of the wheel and through an arc which subtends the angle $90°\pm l$, means connected to said wheel to turn said wheel and to move the first-named bar to a second position in which the parallel line associated therewith is seen through the eye tube in the same position as it was seen when the eye tube was in its first position and means to indicate the angle through which the wheel is thus turned, said angle being the altitude of the celestial body.

9. An apparatus for measuring the indicated altitude of a celestial body, when there are given the declination $d$ and the local hour angle $t$ of the celestial body and an assumed or dead reckoning latitude $l$ of the observer, having in combination, a supporting frame, a wheel mounted to turn about its axis, means to measure the angle through which the wheel is turned, two straight-edge means at right angles to one another and intersecting, each capable of bodily movement at right angles to its length, means to move said straight-edge means to mutual positions in which the first straight-edge means is offset from the axis of the wheel by a distance equal to sin $d$ and the other straight-edge means is offset from the axis of the wheel by a distance equal to cos $d$ cos $t$, indicator means movable to an initial position corresponding to the intersection of said straight-edge means and then to a second position at the same radial distance from the axis of the wheel and through an arc which subtends the angle $90°\pm l$, means coordinating the bodily movement of said first straight-edge means and the angular movement of said wheel whereby when said first straight-edge means is in said second position said wheel is in an angular position corresponding to the indicated altitude of the celestial body for the conditions given.

10. An apparatus for measuring the indicated altitude of a celestial body, when there are given the declination $d$ and the local hour angle $t$ of the celestial body and an assumed or dead reckoning latitude $l$ of the observer, having in combination, a supporting frame, a wheel mounted to turn about its axis, means to measure the angle through which the wheel is turned, two straight-edge means at right angles to one another and intersecting, each capable of bodily movement at right angles to its length, means to move said straight-edge means to mutual positions in which the first straight-edge means is offset from the axis of the wheel by a distance equal to sin $d$ and the other straight-edge means is offset from the axis of the wheel by a distance equal to cos $d$ cos $t$, indicator means including an eye tube movable to an initial position corresponding to the intersection of said straight-edge means and then to a second position at the same radial distance from the axis of the wheel and through an arc which subtends the angle $90°\pm l$, means coordinating the bodily movement of said first straight-edge means and the angular movement of said wheel, whereby when said first straight-edge means is in said second position said wheel is in an angular position corresponding to the indicated altitude of the celestial body for the conditions given.

11. An apparatus for measuring the indicated altitude of a celestial body, when there are given the declination $d$ and the local hour angle $t$ of the celestial body and an assumed or dead reckoning latitude $l$ of the observer, having in combination, a supporting frame, a wheel mounted to turn about its axis, means to measure the angle through which the wheel is turned, two straight-edge means at right angles to one another and intersecting, each capable of bodily movement at right angles to its length, manually operable means including said wheel to move said straight-edge means to mutual positions in which the first straight-edge means is offset from the axis of the wheel by a distance equal to sin $d$ and the other straight-edge means is offset from the axis of the wheel by a distance equal to cos $d$ cos $t$, indicator means movable to an initial position corresponding to the intersection of said straight edge means, and then to a second position at the same radial distance from the axis of the wheel and through an arc which subtends the angle $90°\pm l$, means coordinating the bodily movement of said first straight-edge means and the angular movement of said wheel, whereby when said first straight-edge means is in said second position said wheel is in an angular position corresponding to the indicated altitude of the celestial body for the conditions given.

12. An apparatus for indicating the azimuth $z$ of a celestial body, when there are given the declination $d$ and the local hour angle $t$ of the celestial body and an assumed or dead reckoning latitude $l$ of the observer, having the combination recited in claim 9 for indicating the altitude $h$ of the celestial body and, combined therewith, means connected to said wheel to turn said wheel from its zero position and to move the second-named bar to a second position in which the parallel line associated therewith is seen through the eye tube in the same position as it was seen when the eye tube was in its first position, and means to indicate the angle through which the wheel is thus turned, said angle being $180°-z$ or $z$, according to whether the angle subtended by the arc through which the eye tube was turned was $90°-l$ or $90°\pm l$.

13. An apparatus for indicating the azimuth $z$ of a celestial body, when there are given the declination $d$ and the local hour angle $t$ of the celestial body and an assumed or dead reckoning latitude $l$ of the observer, having the combination recited in claim 9 for indicating the altitude $h$ of the celestial body and, combined therewith, means coordinating the turning of said wheel from its zero position and the bodily movement of the second named straight-edge means to a second position whereby when said second straight-edge means is in its second position said wheel indicates the azimuth angle through which the wheel was thus turned, said azimuth angle being $180°-z$ or $z$, according to whether the angle subtended by the arc through which the indicator means was turned was $90°-l$ or $90°\pm l$.

14. An apparatus for indicating the azimuth $z$ of a celestial body, when there are given the declination $d$ and the local hour angle $t$ of the celestial body and an assumed or dead reckoning latitude $l$ of the observer, having the combination recited in claim 10 for indicating the altitude $h$ of the celestial body and, combined therewith, means coordinating the turning of said wheel from its zero position and the bodily movement of the second named straight-edge means to a second position whereby when said second straight-edge means is in its second position said wheel indicates the azimuth angle through which the wheel was thus turned, said azimuth angle being $180°-z$ or $z$, according to whether the angle subtended by the arc through which the indicator means was turned was $90°-l$ or $90°+l$.

15. An apparatus for indicating the azimuth $z$ of a celestial body, when there are given the declination $d$ and the local hour angle $t$ of the celestial body and an assumed or dead reckoning latitude $l$ of the observer, having the combination recited in claim 11 for indicating the altitude $h$ of the celestial body and, combined therewith, means coordinating the turning of said wheel from its zero position and the bodily movement of the second named straight-edge means to a second position whereby when said second straight-edge means is in its second position said wheel indicates the azimuth angle through which the wheel was thus turned, said azimuth angle being $180°-z$ or $z$, according to whether the angle subtended by the arc through which the indicator means was turned was $90°-l$ or $90°+l$.

16. An apparatus for indicating the altitude of a celestial body when there are given the declination $d$ and the local hour angle $t$ of the celestial body and an assumed or dead reckoning latitude $l$ of the observer, having in combination a supporting frame having a point 0 thereon representing the center of the earth, a wheel mounted to turn about said point 0 as a center, two bars at right angles to each other, each bar having means to indicate visibly a line parallel with its length and being capable of bodily movement at right angles to its length, manually operable means to move said bars to positions in which the said lines thereon intersect at a point in close definite relation to a point G representing the intersection with the observer's meridian plane of a line perpendicular to said plane and passing through the ground point of said celestial body on the surface of the earth, an eye tube movably mounted on said frame, manually operable means to move said eye tube to a position in which said point G is visible therein in a definite position, a clamp to clamp said eye tube to said wheel, means to move said wheel to carry said eye tube to a point E, the radial distance of which from the point 0 is equal to the radial distance of the point G and which is distant from said point G by an angle equal to $90°\pm l$, means to move the wheel and thereby one of said bars until said line thereon is seen through the eye tube in the same position in which it was seen when the eye tube was in its first position and means to indicate the angle through which said wheel has thus been turned, said angle being the altitude of said celestial body.

17. An apparatus for indicating the altitude $h$ and azimuth $z$ of a celestial body, when there are given the declination $d$ and the local hour angle $t$ of the celestial body and an assumed or dead reckoning latitude $l$ of the observer, having in combination a supporting frame, an indicator wheel, means to turn said wheel, two bars at right angles to one another, each capable of bodily movement at right angles to its length and having means to indicate visibly a line parallel with its length, means to move said bars to a position in which said line on one bar is offset from the axis of the wheel by a distance equal to sin $d$ and said line on the other bar is offset from the axis of the wheel by a distance equal to cos $d$ cos $t$, an eye tube, means to move said eye tube first to a position in which the intersection of said lines is visible therethrough and then to a second position at the same radial distance from the axis of the wheel and through an arc which subtends the angle $90°\pm l$, means involving the turning of said wheel to move the first-named bar to a second position in which the line thereon is seen through the eye tube in the same position as it was seen when the eye tube was in its first position, means to indicate the angle through which the wheel is thus turned, said angle being the altitude $h$ of the celestial body, means involving the turning of said wheel from its zero position to move the second named bar to a second position in which the line thereon is seen through the eye tube in the same position as it was seen when the eye tube was in its first position, and means to indicate the angle through which the wheel is thus turned, said angle being $180°-z$ or $z$, according to whether the angle subtended by the arc through which the eye tube was turned was $90°-l$, or $90°+l$.

18. An apparatus for measuring the third side, $90°-h$, opposite a pole, and one of the angles $z$, not given, of a spherical triangle, given two sides, respectively $90°-l$ and $90°-d$, and the included angle $t$ (less than $180°$) at said pole, said pole being an apex of the triangle, comprising two mutually perpendicular bars, each having an indicative line thereon and capable of movement in a direction perpendicular to its length, means to move each of said bars first to positions in which their indicative lines intersect at a point G which is at a distance of sin $d$ from the equator line and at a distance of cos $d$ cos $t$ from a line passing through the poles, and second to positions in which said indicative lines intersect at a point E which is at the same distance from the center as the point G and is distant from G by an arc subtended by an angle equal to one given side of said triangle, whereby the perpendicular from the point E to the equator line is equal to sin $h$, and means for measuring the angle subtended by the arc of a circle, the radius of which is equal to cos $h$, said arc extending from said equator line to the indicative line perpendicular to the equator line and passing through the point E, said angle being equal to $180°-z$.

19. In a device of the character described, a frame, a rotatable wheel mounted in said frame, manually operated gearing to rotate said wheel, means for measuring rotation of said wheel, a radial slide carried by said wheel, a pair of members movable on said frame at right angles to each other, an eye-piece carried by the slide for indicating points of intersection of said members determined by settings of said wheel and said slide, means for moving said members so that their point of intersection corresponds to a point E, which point has the same relation to the equator line of the observer as the point, which is the projection of the ground point of the observed celestial body on the observer's meridian plane, has to the observer's horizon line, a shaft having two counter wheels thereon, one counter, representing minutes, having two sets of markings from 0 to 60 arranged in opposite directions and the other counter, representing degrees, having two sets of markings from 0 to 10 arranged in opposite directions, means adapted to permit said shaft to be clutched to the gearing operated by said wheel to indicate the minutes and degree units of the observed altitude of the celestial body, means to operate said shaft until one of said movable members passes through the point E, whereby the reading on said counters, which is lesser of the two indicates the intercept or difference between the observed altitude and the computed altitude of the celestial body.

20. In a device of the character described, a frame, a rotatable member mounted in said frame, manually operated gearing to rotate said member, means for measuring rotation of said member, a radial slide carried by said wheel, a pair of members movable on said frame at right angles to each other, means carried by the slide for indicating points of intersection of said members determined by settings of said rotatable member and said slide, a shaft having counter wheels thereon, manually operable means adapted to rotate said shaft to cause said counter wheels to indicate the minutes and at least the degree units of the observed altitude of the celestial body, means to clutch said shaft to said gearing and means to rotate said gearing until the reading on said counter wheels indicates the intercept or difference between the observed altitude and the computed altitude of the celestial body in degree units and minutes.

21. In a device of the character described, a frame, a rotatable member mounted on said frame, a radial slide carried by said rotatable member, a pair of members movable on said frame at right angles to each other for marking positions determined by settings of said rotatable member and said slide, a shaft adapted to be adjusted to a given reading corresponding to the observed altitude of a selected celestial body, counters carried on said shaft to indicate the rotation of said shaft, each counter having two sets of figures which are complementary to one another, and means to connect said shaft to and disconnect it from said rotatable member.

22. In a device of the character described, a frame, a rotatable member mounted on said frame, a radial slide, carried by said rotatable member, a pair of members movable on said frame at right angles to each other for marking positions determined by settings of said rotatable member and said slide, a shaft adapted to be adjusted to a given reading, counters carried on said shaft to indicate the rotation of said shaft, means to connect and to disconnect said shaft from said rotatable member.

FRANCIS CHAMBERLAIN.